United States Patent
Seo et al.

(10) Patent No.: US 10,627,994 B2
(45) Date of Patent: Apr. 21, 2020

(54) SEMANTIC ZOOM PREVIEW METHOD AND ELECTRONIC DEVICE

(71) Applicant: Samsung Electronics Co., Ltd., Suwon-si, Gyeonggi-do (KR)

(72) Inventors: Kyung Hwa Seo, Uijeongbu-si (KR); In Hye Youn, Seoul (KR); Jae Han Lee, Suwon-si (KR); Tae Hee Hwang, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/296,419

(22) Filed: Oct. 18, 2016

(65) Prior Publication Data

US 2017/0109037 A1   Apr. 20, 2017

(30) Foreign Application Priority Data

Oct. 20, 2015   (KR) .......................... 10-2015-0146143

(51) Int. Cl.
*G06F 3/0482*   (2013.01)
*G06F 3/0484*   (2013.01)
*G06F 3/0488*   (2013.01)

(52) U.S. Cl.
CPC ........ *G06F 3/0482* (2013.01); *G06F 3/04847* (2013.01); *G06F 3/04883* (2013.01); *G06F 2203/04803* (2013.01); *G06F 2203/04808* (2013.01)

(58) Field of Classification Search
CPC ............. G06F 3/04845; G06F 3/04883; G06F 3/04887
See application file for complete search history.

(56) References Cited

U.S. PATENT DOCUMENTS

| | | | |
|---|---|---|---|
| 8,291,349 B1* | 10/2012 | Park | G06F 3/04883 715/705 |
| 8,635,527 B2 | 1/2014 | Saeki et al. | |
| 8,952,886 B2* | 2/2015 | Tsuk | G06F 1/1626 345/156 |
| 9,007,402 B2 | 4/2015 | Systrom et al. | |
| 2002/0118169 A1* | 8/2002 | Hinckley | G06F 3/0362 345/163 |
| 2006/0132455 A1* | 6/2006 | Rimas-Ribikauskas | G06F 3/0414 345/173 |
| 2006/0132456 A1* | 6/2006 | Anson | G06F 3/0488 345/173 |
| 2007/0133015 A1 | 6/2007 | Saeki et al. | |

(Continued)

FOREIGN PATENT DOCUMENTS

JP   2014010719 A *  1/2014  ............. G06F 3/041

*Primary Examiner* — Justin R. Blaufeld
(74) *Attorney, Agent, or Firm* — Jefferson IP Law, LLP

(57) ABSTRACT

An electronic device is provided. The electronic device includes an input interface configured to receive a user input, a memory configured to store an application using an item, a display, and a processor. The processor is configured to obtain the user input through the input interface while an execution screen of the application is output, determine a change screen based on a variation of the user input, wherein the change screen is configured to be outputted when the user input is released, and while the user input is maintained, output a preview which includes at least part of the change screen to the display.

18 Claims, 24 Drawing Sheets

(56) References Cited

U.S. PATENT DOCUMENTS

| | | | |
|---|---|---|---|
| 2008/0284741 A1* | 11/2008 | Hsu | G06F 3/0485 345/173 |
| 2010/0283743 A1* | 11/2010 | Coddington | G06F 3/0485 345/173 |
| 2011/0050630 A1* | 3/2011 | Ikeda | G06F 3/0488 345/174 |
| 2011/0054837 A1* | 3/2011 | Ikeda | G06F 3/0414 702/155 |
| 2011/0316884 A1* | 12/2011 | Giambalvo | G06F 3/04815 345/660 |
| 2012/0026090 A1* | 2/2012 | Zielke | G06F 3/03543 345/163 |
| 2013/0067390 A1* | 3/2013 | Kwiatkowski | G06F 9/451 715/784 |
| 2013/0067391 A1* | 3/2013 | Pittappilly | G06F 3/0488 715/784 |
| 2013/0067398 A1* | 3/2013 | Pittappilly | G06F 3/0482 715/800 |
| 2013/0067399 A1* | 3/2013 | Elliott | G06F 3/0482 715/800 |
| 2013/0067420 A1* | 3/2013 | Pittappilly | G06F 3/0236 715/863 |
| 2013/0311938 A1* | 11/2013 | Frazier | G06F 3/044 715/781 |
| 2014/0002387 A1* | 1/2014 | Hashiba | G06F 3/041 345/173 |
| 2014/0047380 A1* | 2/2014 | Mak | G06F 3/04883 715/800 |
| 2014/0078172 A1 | 3/2014 | Systrom et al. | |
| 2014/0164990 A1 | 6/2014 | Kim et al. | |
| 2014/0164991 A1 | 6/2014 | Kim et al. | |
| 2014/0168153 A1* | 6/2014 | Deichmann | G06F 3/044 345/174 |
| 2014/0245213 A1* | 8/2014 | Gardenfors | H04L 51/066 715/778 |
| 2014/0282247 A1* | 9/2014 | Yuan | G06F 3/0482 715/823 |
| 2014/0306905 A1 | 10/2014 | Kim et al. | |
| 2015/0062052 A1* | 3/2015 | Bernstein | G06F 3/0416 345/173 |
| 2015/0067596 A1* | 3/2015 | Brown | G06F 3/0416 715/808 |
| 2015/0177979 A1* | 6/2015 | Johansson | G06F 3/0412 715/763 |
| 2015/0186035 A1 | 7/2015 | Systrom et al. | |
| 2015/0249882 A1* | 9/2015 | Patil | G06F 3/167 381/123 |
| 2015/0317026 A1 | 11/2015 | Kim et al. | |
| 2015/0325211 A1 | 11/2015 | Kim et al. | |
| 2016/0202852 A1 | 7/2016 | Kim et al. | |
| 2017/0046059 A1* | 2/2017 | Karunamuni | G06F 3/0488 |

\* cited by examiner

SEMANTIC ZOOM PREVIEW METHOD AND ELECTRONIC DEVICE

CROSS-REFERENCE TO RELATED APPLICATION(S)

This application claims the benefit under 35 U.S.C. § 119(a) of a Korean patent application filed on Oct. 20, 2015 in the Korean Intellectual Property Office and assigned Serial number 10-2015-0146143, the entire disclosure of which is hereby incorporated by reference.

TECHNICAL FIELD

The present disclosure relates to a method of outputting a screen.

BACKGROUND

In recent years, applications that support various functions have been installed in an electronic device such as a smartphone or the like. The applications may support, for example, a function such as a media file playback, shooting, a schedule management, a file management, or the like. Furthermore, the electronic device may display items (e.g., a media file, a picture file, a schedule information file, a folder, or the like), which are associated with the applications, on a screen. For example, the electronic device may classify the items for each class and may display the classified items on the screen such that the electronic device searches for and manages the items. In addition, the electronic device may divide the screen and may output the applications on the divided screens.

However, in the case where classification states of the items are changed according to the change in a class, it is difficult for an electronic device according to the related art to intuitively verify a hierarchical structure of the items and a movement range between classes. In addition, when the electronic device according to the related art changes classes with respect to classification states of the items, the electronic device according to the related art should perform a plurality of operations for the movement range corresponding to a plurality of classes. In addition, the electronic device according to the related art troublesomely performs the operations to divide a screen.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a screen output method that provides the preview of a function execution screen if an input for changing a screen output state and an electronic device supporting the same.

Another aspect of the present disclosure is to provide a screen output method that changes a class corresponding to at least one movement range associated with the classification states of items based on a designated input and an electronic device supporting the same.

Another aspect of the present disclosure is to provide a screen output method that changes a layout corresponding to at least one movement range associated with the division state of a screen based on a designated input and an electronic device supporting the same.

In accordance with an aspect of the present disclosure, an electronic device is provided. The electric device includes an input interface configured to receive a user input, a memory configured to store an application using at least one item, a display, and a processor. The processor may be configured to obtain the user input through the input interface while an execution screen of the application is output, determine a change screen based on a variation of the user input, wherein the change screen is configured to be outputted when the user input is released, and, while the user input is maintained, output a preview which includes at least part of the change screen to the display.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
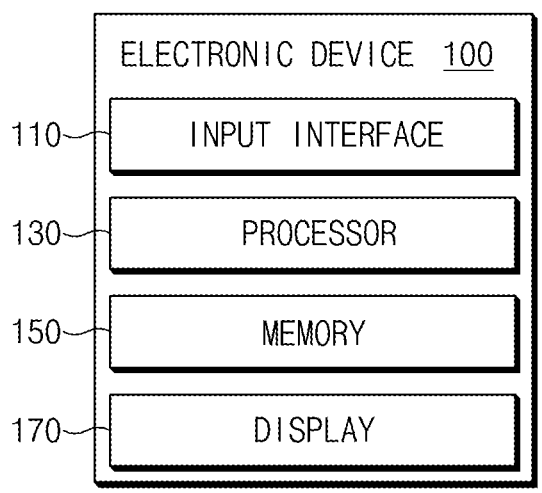
FIG. 1 illustrates an electronic device associated with a function execution screen output, according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," and "have", or "may include," or "may comprise" and "may have" used herein indicates disclosed functions, operations, or existence of elements but does not exclude other functions, operations or elements.

For example, the expressions "A or B," or "at least one of A and/or B" may indicate A and B, A, or B. For instance, the expression "A or B" or "at least one of A and/or B" may indicate (1) at least one A, (2) at least one B, or (3) both at least one A and at least one B.

The terms such as "1st," "2nd," "first," "second," and the like used herein may refer to modifying various different elements of various embodiments of the present disclosure, but are not intended to limit the elements. For instance, "a first user device" and "a second user device" may indicate different users regardless of order or importance. For example, a first component may be referred to as a second component and vice versa without departing from the scope and spirit of the present disclosure.

In various embodiments of the present disclosure, when a component (for example, a first component) is referred to as being "operatively or communicatively coupled with/to" or "connected to" another component (for example, a second component), the component may be directly connected to the other component or connected through another component (for example, a third component). In various embodiments of the present disclosure, when a component (for example, a first component) is referred to as being "directly connected to" or "directly accessed" another component (for example, a second component), another component (for example, a third component) does not exist between the component (for example, the first component) and the other component (for example, the second component).

The expression "configured to" used in various embodiments of the present disclosure may be interchangeably used with "suitable for," "having the capacity to," "designed to," "adapted to," "made to," or "capable of" according to the situation, for example. The term "configured to" may not necessarily indicate "specifically designed to" in terms of hardware. Instead, the expression "a device configured to" in some situations may indicate that the device and another device or part are "capable of" For example, the expression "a processor configured to perform A, B, and C" may indicate a dedicated processor (for example, an embedded processor) for performing a corresponding operation or a general purpose processor (for example, a central processing unit (CPU) or application processor (AP)) for performing corresponding operations by executing at least one software program stored in a memory device.

Terms used in various embodiments of the present disclosure are used to describe certain embodiments of the present disclosure, but are not intended to limit the scope of other embodiments. The terms of a singular form may include plural forms unless they have a clearly different meaning in the context. Otherwise, all terms used herein may have the same meanings that are generally understood by a person skilled in the art. In general, terms defined in a dictionary should be considered to have the same meanings as the contextual meaning of the related art, and, unless clearly defined herein, should not be understood differently or as having an excessively formal meaning. In any case, even the terms defined in the present specification are not intended to be interpreted as excluding embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group phase 1 or phase 2 (MPEG-1 or MPEG-2) audio layer 3 (MP3) player, a mobile medical device, a camera, or a wearable device. The wearable device may include at least one of an accessory-type device (e.g., a watch, a ring, a bracelet, an anklet, a necklace, glasses, a contact lens, a head-mounted device (HMD)), a textile- or clothing-integrated-type device (e.g., an electronic apparel), a body-attached-type device (e.g., a skin pad or a tattoo), or a bio-implantable-type device (e.g., an implantable circuit).

In various embodiments of the present disclosure, an electronic device may be a home appliance. The smart home appliance may include at least one of, for example, a television (TV), a digital video/versatile disc (DVD) player, an audio, a refrigerator, an air conditioner, a cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, or an electronic picture frame.

In various embodiments of the present disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA), a magnetic resonance imaging (MRI), a computed tomography (CT), a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller machine (ATM), a point of sales (POS) device of a store, or an Internet of things (IoT) device (e.g., a light bulb, various sensors, an electric or gas meter, a sprinkler, a fire alarm, a thermostat, a streetlamp, a toaster, exercise equipment, a hot water tank, a heater, a boiler, or the like).

According to various embodiments of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like). An electronic device may be one or more combinations of the above-mentioned devices. An electronic device according to some various embodiments of the present disclosure may be a flexible device. An electronic device according to an embodiment of the present disclosure is not limited to the above-mentioned devices, and may include new electronic devices with the development of new technology.

Hereinafter, an electronic device according to various embodiments of the present disclosure will be described in more detail with reference to the accompanying drawings. The term "user" used herein may refer to a person who uses an electronic device or may refer to a device (e.g., an artificial intelligence electronic device) that uses an electronic device.

FIG. 1 illustrates an electronic device associated with a function execution screen output, according to various embodiments of the present disclosure.

Referring to FIG. 1, an electronic device 100 may store applications supporting various functions and may output the execution screen of the applications. For example, the electronic device 100 may output the execution screen of a media file playback application, a camera application, an album application, a schedule management application, a file management application, or the like. In addition, the electronic device 100 may output items, which are associated with the applications, for example, a media file, a picture file, a schedule information file, a folder, or the like on a screen in response to the execution of the applications.

According to various embodiments, the electronic device 100 may perform a function of classifying the items and a function of dividing a screen. According to an embodiment, if an input that changes a screen output state is received, the electronic device 100 may analyze the input, may perform an item classification function, a screen division function, or the like based on the analyzed result, and may output a different screen (or a function execution screen).

According to various embodiments, after classifying the items, the electronic device 100 may display the classified items on a screen. For example, the class may be a group of the items that have the same or similar attributes (or the same or similar kinds). According to an embodiment, the electronic device 100 may classify the items including time information for each class in units of year, month, week, or day. For example, on the basis of the generated or stored time of the items, the electronic device 100 may classify the items for each class. In this case, the electronic device 100 may distinguish a time when the items are generated or stored, in units of year, month, week, or day. Also, the electronic device 100 may classify items, which are generated or stored in the same or similar years, as one class. Likewise, the electronic device 100 may classify each of the items, which are generated or stored in the same or similar months, weeks, or days, as one class.

According to various embodiments, the electronic device 100 may classify units of year, month, week, or day as in any sequential order (e.g., hierarchical structure). According to an embodiment, the electronic device 100 may classify items, which are generated or stored in the same or similar years, as the top-level class and may classify the items, which are generated or stored in the same or similar months, weeks, or days, as a lower class in order.

According to various embodiments, the electronic device 100 may designate the class based on a type of the items or user configuration information. According to an embodiment, the electronic device 100 may designate the class based on a time when the items are generated or stored. According to an embodiment, the electronic device 100 may designate the class based on a storage path of the items. For example, the electronic device 100 may classify a root directory as a top-level class and may classify a file stored in a subdirectory or a directory as a lower class.

According to various embodiments, after changing the items in response to a designated input, the electronic device 100 may display the changed items. For example, after changing the items included in the first class into items included in the second class in response to a designated input, the electronic device 100 may display the changed items.

According to various embodiments, before classification states of the items are changed in response to a designated input, the electronic device 100 may provide a preview associated with the selected class. In the case where the designated input is changed with the designated input maintained, the electronic device 100 may select a class associated with the items based on the input and may provide a preview associated with the selected class. Accordingly, a user may verify the preview and may change classification states of the items into a desired class.

According to various embodiments, the electronic device 100 may change a division state of a screen in response to a designated input. For example, the electronic device 100 may change a screen division state from a first layout to a second layout in response to the designated input.

According to various embodiments, before changing the division state of a screen, the electronic device 100 may provide a preview associated with the selected layout in response to the designated input. In the case where the designated input is changed with the designated input maintained, the electronic device 100 may select a layout of a screen based on the variation of the designated input and may provide a preview associated with the selected layout. Accordingly, a user may verify the preview and may change the screen into a desired layout.

Referring to FIG. 1, the electronic device 100 may include an input interface 110, a processor 130, a memory 150, and a display 170. The input interface 110 may send an instruction or data, input from a user or another external device, to other element(s) of the electronic device 100.

According to various embodiments, the input interface 110 may include, for example, a touch panel, a (digital) pen sensor, a key, an ultrasonic input unit, or the like. For example, the touch panel may use at least one of capacitive, resistive, infrared and ultrasonic detecting methods. Furthermore, the touch panel may further include a control circuit. The touch panel may further include a tactile layer. In this case, the touch panel may provide a tactile reaction to a user. The (digital) pen sensor may be, for example, a part of the touch panel or may include an additional sheet for recognition. The key may include, for example, a physical button, an optical key, a keypad, or the like. The ultrasonic input device may detect (or sense) an ultrasonic signal, which is received from an input device, through a microphone and may verify data corresponding to the detected ultrasonic signal. The input interface 110 may further include a pressure sensor. The pressure sensor may detect a pressure corresponding to an input through a piezoresistive type, a piezoelectric type, a capacitance type, an inductance type, or the like.

According to various embodiments, the input interface 110 may receive an input for classifying the items. For example, the input interface 110 may receive an input for selecting time information, a storage path, or the like among types of classes. In this regard, the input interface 110 may include an object (e.g., a menu, a popup, a button, or the like) that allows a user to select a type of the class.

The input interface 110 may receive a designated input for changing an output state of a screen. The designated input may include, for example, a gesture (e.g., a pinch gesture) input, a touch input, a button input, a voice input, or the like. In embodiments described below, a pinch gesture input will be described, for descriptive convenience, by using the designated input. According to various embodiments, the input interface 110 may send an input value associated with the designated input to the processor 130.

The processor 130 may include one or more of a CPU, an AP, or a communication processor (CP). The processor 130 may perform, for example, data processing or an operation associated with control and/or communication of at least one other component s of the electronic device 100.

According to various embodiments, the processor 130 may perform an application. If an execution request of a specific application in the electronic device 100 is received, the processor 130 may verify an environment, for example, the remaining space of the memory 150, for performing the application and may allocate resources (e.g., memory, processor, libraries, etc.) for the application. According to various embodiments, the processor 130 may output a screen associated with the execution of the application on the display 170. Moreover, the processor 130 may output items (e.g., a media file, a picture file, a schedule information file, a folder, and the like) associated with the application on the display 170 in response to the execution of the application.

According to various embodiments, the processor 130 may classify the items for each class. According to an embodiment, on the basis of types of the items or user configuration information (e.g., information about a type of selected class), the processor 130 may classify the items for each class. For example, in the case of an item, which includes time information, such as a media file, a picture file, a schedule information file, or the like, the processor 130 may classify the item after designating the class to the generation or storage time of the item. Furthermore, in the case of various types of files and folders, the processor 130 may classify the item after designating the class to a storage path.

According to various embodiments, the processor 130 may divide a screen. According to an embodiment, the processor 130 may divide a screen into a plurality of subscreens based on the selected layout.

According to various embodiments, the processor 130 may change classification states according to classes of the items and may display the changed classification states on the display 170. According to an embodiment, the processor 130 may analyze an input value, which corresponds to a designated input, for changing the screen output state and may perform a function based on the analyzed result. For example, the processor 130 may perform a classification function or screen division function of the items based on the analyzed result.

According to various embodiments, in the case where the designated input (e.g., a two-finger pinch gesture input) associated with the classification function of the items is received, the processor 130 may change the classification states of the items. For example, the processor 130 may change the classes of the items and may display the changed classes on the display 170. In addition, before changing the classification states of the items, the processor 130 may provide a preview with respect to the selected class in response to a designated input. According to an embodiment, the processor 130 may output a preview associated with the selected class on the display 170. The preview associated with the selected class may include a designated image, text, video, or the like indicating classification states of the items for each class. According to an embodiment, the processor 130 may designate snapshot images associated with display states of the items, which are classified for each class, as previews of the classes, respectively. Alternatively, in the case where there is no snapshot image associated with the class, the processor 130 may designate a preview as a default image corresponding to the class.

According to various embodiments, in the case where the designated input (e.g., a three-finger pinch gesture input) associated with a screen division is received, the processor 130 may divide a screen. For example, the processor 130 may change the first layout into the second layout and may divide the screen based on the changed layout. In addition, the processor 130 may provide a preview associated with the selected layout before dividing the screen in response to a designated input. The preview associated with the layout may include a designated image, text, video, or the like indicating that the screen will be divided into a plurality of subscreens.

According to various embodiments, in the case where the designated input is changed with the input maintained, the processor 130 may select a class associated with the items or a layout of a screen based on the variation of the designated input and may provide a preview associated with the selected class or layout. Furthermore, if the designated input ends (e.g., the designated input is released), the processor 130 may end an output of the preview (e.g., the processor 130 terminates the output of the preview) and may change classification states of the items into the selected class or may divide the screen based on the selected layout.

In this regard, the variation of the designated input may be varied according to a type of the designated input. As an example, in the case where the designated input is a pinch gesture input, the processor 130 may differently select the class of the items or the layout of a screen based on the location variation from the first input location of the input. As another example, in the case where the designated input is a touch input, the processor 130 may select the class of the items or the layout of a screen based on the location variation from the first input location, a changed direction, the intensity (e.g., a pressure) of the touch input, or the like. When the designated input is a gesture input (e.g., a hovering input) that does not touch a screen, the processor 130 may select the class of the items or the layout of a screen based on the location variation from the first input location, the changed direction, the form change of the gesture input, or the like. As an example, in the case of the gesture input that does not touch a screen, the processor 130 may detect the location, the direction, the form, and the like of a gesture input by using the variation of the capacitance of a touch panel or a camera (not illustrated) included in the electronic device 100.

The memory 150 may include a volatile and/or a nonvolatile memory. For example, the memory 150 may store instructions or data associated with at least one other component(s) of the electronic device 100. According to an embodiment, the memory 150 may store at least one application. For example, the memory 150 may store a media file playback application, a camera application, an album application, a schedule management application, a file management application, or the like. In addition, the memory 150 may store items associated with an application. For example, the memory 150 may store a media file, a picture file, a schedule information file, a folder, or the like. The memory 150 may store a preview associated with a classification state for each class of the items. For example, the memory 150 may store a snapshot image, a default image, or the like associated with a classification state for each class of the items. According to various embodiments, the memory 150 may store a preview associated with the layout. Moreover, the memory 150 may store screen division configuration information. The screen division configuration information may include the number, the locations, or the sizes of subscreens that are divided according to each layout.

The display 170 may display, for example, various types of contents (e.g., a text, an image, a video, an icon, a symbol, and the like) to a user. For example, the display 170 may output the execution screen of an application. Furthermore, the display 170 may output items in response to the execution of the application. According to various embodiments, the display 170 may output a preview associated with a classification state for each class of the items. According to various embodiments, the display 170 may output a preview associated with the layout. The display 170 may include a touch screen and may receive, for example, a touch, gesture, proximity, or hovering input using an electronic pen or a part of a user's body.

Figure 2:
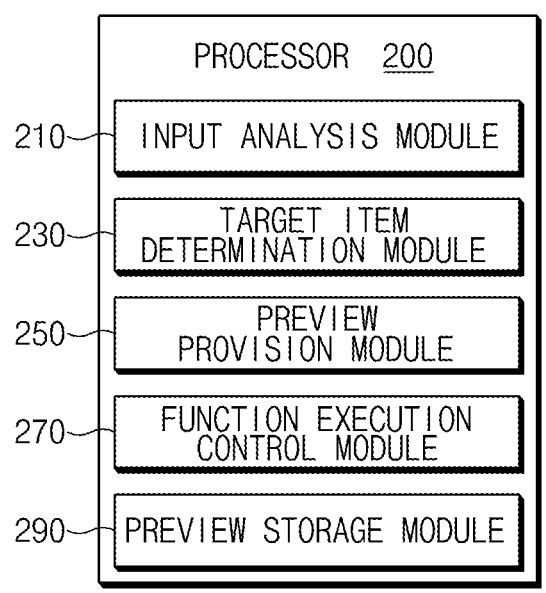
FIG. 2 illustrates a processor, according to various embodiments of the present disclosure.

FIG. 2 illustrates a processor, according to various embodiments of the present disclosure.

Referring to FIG. 2, a processor 200 may include an input analysis module 210, a target item determination module 230, a preview provision module 250, a function execution control module 270, and a preview storage module 290. According to various embodiments, the processor 200 may perform a function the same as or similar to that of the processor 130 illustrated in FIG. 1. Also, the processor 200 may further include at least one another element in addition to the above-described elements, or at least one of the above-described elements may be omitted from the processor 200.

The input analysis module 210 may analyze an input value that is received from an input interface (e.g., the input interface 110 of FIG. 1). According to an embodiment, the input analysis module 210 may determine a type, a location, a size, a duration time, or the like of an input. For example, the input analysis module 210 may determine whether the input is a gesture input, touch input, button input, or voice input. If the input is a pinch gesture input, the input analysis module 210 may determine locations (e.g., a location in which fingers makes contact with a touch screen) of input points, a size (e.g., a distance (interval) between input points) of an input, an input duration time, or the like.

According to various embodiments, the input analysis module 210 may determine an execution function based on a type of the input. According to an embodiment, in the case where the input is a two-finger pinch gesture input, the input analysis module 210 may determine the classification function of items as the execution function. In the case where the input is a three-finger pinch gesture input, the input analysis module 210 may determine a screen division function as the execution function.

According to various embodiments, if the execution function is determined, the input analysis module 210 may send information about the function to the target item determination module 230 or the function execution control module 270. According to an embodiment, in the case where the execution function is the classification function of items, the input analysis module 210 may send a type of the input, locations of input points, a size of an input, an input duration time, or the like to the target item determination module 230 and the function execution control module 270. In addition, in the case where the execution function is a screen division function of items, the input analysis module 210 may send a type of the input, locations of input points, a size of an input, an input duration time, or the like to the function execution control module 270.

The target item determination module 230 may determine the target items, which are classified for each class based on the input. For example, the target item determination module 230 may designate an item output to the location of the input or an item output to a location, which is adjacent to the location of the input, as a target item. Alternatively, in the case where there is no item output to the location of the input, the target item determination module 230 may designate an item associated with an application, which is currently activated, (or executed in foreground mode) as the target item. For example, in the case where an application that is currently activated is a media file playback application, the target item determination module 230 may designate the target item to a media file. Alternatively, in the case where the application that is currently activated is a file management application, the target item determination module 230 may designate the target item to a file or folder. Moreover, the target item determination module 230 may determine items, which have attributions the same as or similar to those of a designated target item, to target items.

According to various embodiments, the target item determination module 230 may designate a type of class based on a type of target item or user configuration information. According to an embodiment, in the case of an item, which includes time information, for example, a media file, a picture file, or a schedule information file, or the like, the target item determination module 230 may classify the class in units of time. In addition, in the case of various types of files and folders, the target item determination module 230 may classify the class after designating the class to a storage path.

The preview provision module 250 may provide a preview associated with a class or a preview associated with a layout. According to various embodiments, in the case where the input associated with the classification function of the items is received, the preview provision module 250 may provide a preview associated with the selected class. According to an embodiment, if the input is received, the preview provision module 250 may provide the preview of the first priority class based on a designated class order. For example, in the case where a type of the class is designated to time information and where a year class being a top-level class is set to the first priority class, the preview provision module 250 may provide a preview associated with a state in which items, which are generated or stored in the same or similar years are classified. According to an embodiment, the first priority class is set to a day class, and the preview provision module 250 may provide a preview associated with a state classified as items, which are generated or stored in a day the same as or similar to each other.

According to various embodiments, in the case where the input associated with a screen division is received, the preview provision module 250 may provide a preview associated with the selected layout. According to an embodiment, if the input is received, the preview provision module 250 may provide the preview of the first priority layout based on the order of the designated layout.

According to various embodiments, if a movement range between classes with respect to classification states of the items is designated according to a type, location, size, duration time, or the like of the input, the preview provision module 250 may sequentially provide a preview associated with a class included in the movement range. For example, if the movement range is designated to the N-th operation (or depth), the preview provision module 250 may sequentially provide previews that are associated with priority classes from the M-th priority class to the (M+N)-th priority class. Alternatively, the preview provision module 250 may sequentially provide previews that are associated with priority classes from the (M+N)-th priority class to the M-th priority class.

According to various embodiments, if a movement range between layouts with respect to classification states of the items is designated according to the input, the preview provision module 250 may sequentially provide a preview associated with a layout included in the movement range. For example, if the movement range is designated to the N-th operation, the preview provision module 250 may sequentially provide previews that are associated with priority layouts from the M-th priority layout to the (M+N)-th priority layout. Alternatively, the preview provision module 250 may sequentially provide previews that are associated with priority layouts from the (M+N)-th priority layout to the M-th priority layout. According to various embodiments, the preview provision module 250 may output the preview on a display (e.g., the display 170 of FIG. 1).

The function execution control module 270 may designate the movement range of a preview according to the set execution function. According to an embodiment, in the case where the input associated with the classification function of the items is received, the function execution control module 270 may designate the movement range between classes with respect to classification states of the items based on a type, location, size, duration time, or the like of the input. Furthermore, in the case where the input associated with a screen division is received, the function execution control module 270 may designate the movement range between layouts with respect to a screen division state based on a type, location, size, duration time, or the like of the input. According to an embodiment, the function execution control module 270 may designate the movement range based on the size of a pinch gesture input, for example, a distance between input points. According to an embodiment, the function execution control module 270 may designate the movement range based on the size (or the change rate) of the change in the distance. For example, in the case where the size of the change in the distance is greater than or equal to the N-th size and is smaller than the (N+1)-th size, the function execution control module 270 may designate the movement range to the N-th operation. For example, if the distance is changed from the first size to the second size, the function execution control module 270 may designate the movement range to the first operation. If the distance is changed from the first size to the third size, the function execution control module 270 may designate the movement range to the second operation.

According to various embodiments, the function execution control module 270 may perform a set execution function. According to an embodiment, in the case where the input associated with the classification function of the items is received, the function execution control module 270 may change the classification state for each class of the items. According to an embodiment, if the input ends (e.g., if fingers corresponding to input points of a pinch gesture input are spaced apart from a touch screen), the function execution control module 270 may classify the items based on the selected class. For example, if the pinch gesture input ends with the movement range designated to the second operation with the items classified according to the first priority class, the function execution control module 270 may classify the items based on the third priority class. For example, in the case where media files are classified into the second priority, the third priority, and the fourth priority class in the order of units of month, week, and day by using a year unit as the first priority class, the function execution control module 270 may classify the media files as a week unit being the third priority class if the pinch gesture input ends with the movement range between classes designated by the second operation while the media files is classified as the year unit being the first priority class based on occurrence of a pinch gesture input. In addition, the function execution control module 270 may output the items, which are classified according to the selected class, on the display.

According to various embodiments, in the case where the input associated with a screen division is received, the function execution control module 270 may change the division state of a screen. According to an embodiment, if the input ends, the function execution control module 270 may divide the screen based on the selected layout. For example, while the screen is classified according to the first priority layout, if the pinch gesture input ends with the movement range designated to the second operation, the function execution control module 270 may divide the screen based on the third priority layout. For example, while a screen is not divided, that is, if a case where the screen is one is set to the first priority layout and a case where a screen is divided into two, three, four, or five subscreens is set to the second priority layout, the third priority layout, the fourth priority layout, or the fifth priority layout, the function execution control module 270 may divide the screen into three subscreens being the third priority layout if the pinch gesture input ends with the movement range between layouts designated by the second operation. Moreover, the function execution control module 270 may output the divided subscreens on the display.

The preview storage module 290 may store a preview associated with a classification state for each class of the items or a preview of a layout with respect to a screen division state in a memory (e.g., the memory 150 of FIG. 1). The preview associated with the classification state for each class of the items may include a designated image, text, video, or the like indicating the classification state for each class of the items. According to an embodiment, the preview storage module 290 may store snapshot images associated with classification states of the items, which are classified for each class, as the preview of the class. Alternatively, in the case where there is no snapshot image associated with the class, the preview storage module 290 may store a default image corresponding to the class as a preview. According to various embodiments, the preview storage module 290 may store a text or the like corresponding to the class together with the snapshot image or the default image. According to various embodiments, the preview of the layout associated with a screen division state may include a designated image, text, video, or the like with respect to the layout.

According to various embodiments, an electronic device may include an input interface configured to receive a user input, a memory configured to store an application using an item, a display, and a processor operatively connected with the input interface, the memory, and the display. The processor may be configured to obtain the user input through the input interface while an execution screen of the application is output, determine a change screen based on a variation of the user input, wherein the change screen is configured to be outputted when the user input is released, and output a preview which includes at least part of the change screen to the display while the user input is maintained.

According to various embodiments, the change screen may be configured to be a first screen which includes the item classified according to a class associated with the item or a second screen which is divided according to a layout, based on a type of the user input.

According to various embodiments, if the change screen is configured to be the first screen, the processor may be configured to determine the class based on the variation of the user input and configure the preview of the change screen such that the item is classified according to the determined class.

According to various embodiments, the processor may be configured to determine at least one of a type of the class and an order of the class based on at least one of a type of the item and user configuration information.

According to various embodiments, if the change screen is configured to be the second screen, the processor may be configured to determine the layout based on the variation of the user input and configure the preview of the change screen such that the change screen is divided according to the determined layout.

According to various embodiments, the processor may be configured to determine the class as a first class or determine the layout as a first layout when a magnitude of the variation of the user input is a first size. The processor may be configured to determine the class as a second class which is lower than the first class according to the level of the class or determine the layout as a second layout which has fewer number of division than the first layout when the magnitude of the variation of the user input is a second size which is larger than the first size.

According to various embodiments, if the user input is a pinch gesture input, the processor may be configured to determine a location variation from a first input location of the pinch gesture input as the variation of the user input.

According to various embodiments, if the user input is released, the processor may be configured to terminate an output of the preview and output the change screen to the display.

According to various embodiments, if another user input is obtained after the user input is released, the processor may be configured to determine another change screen based on a variation of the other user input, wherein the other change screen is configured to be outputted when the other user input is released, and output another preview which includes at least part of the other change screen to the display while the other user input is maintained. The other preview may be configured based on an elapsed time from a point in time when the user input is released.

According to various embodiments, the other preview may be configured with respect to a top-level class or a bottom-level class of the item or a highest priority layout or a lowest priority layout of a screen of the display when the elapsed time is greater than a designated time. The other preview may be configured with respect to a current class of the item or a current layout of the screen of the display when the elapsed time is not greater than the designated time.

Figure 3:
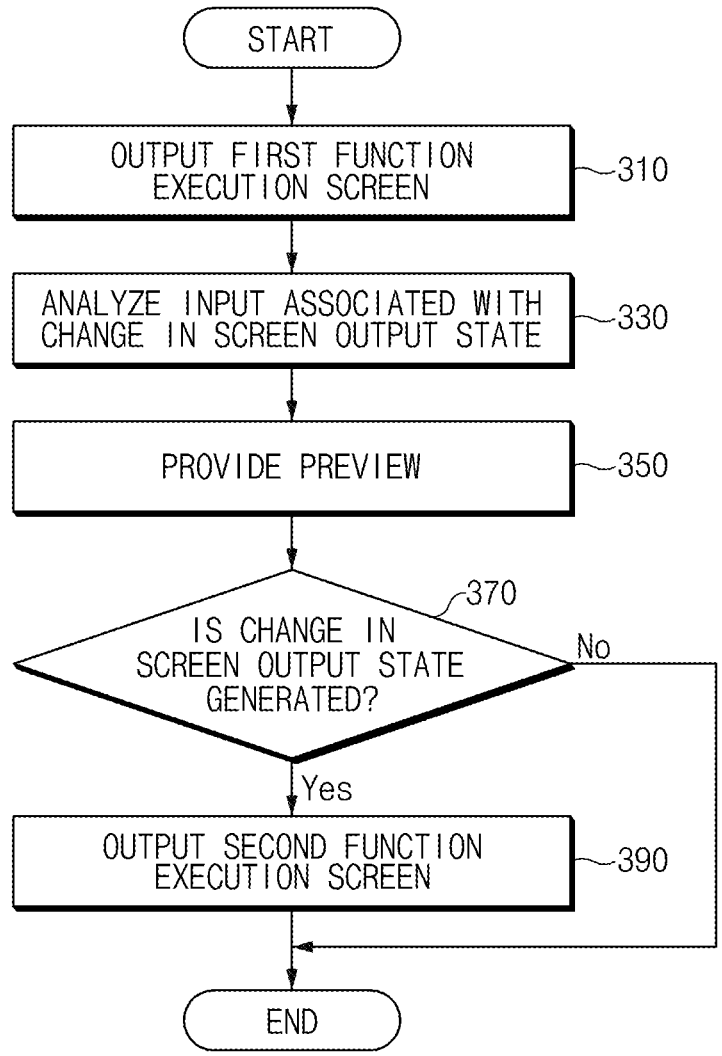
FIG. 3 illustrates a method for providing a function execution screen output, according to various embodiments of the present disclosure.

FIG. 3 illustrates a method for providing a function execution screen output, according to various embodiments of the present disclosure.

Referring to FIG. 3, in operation 310, the electronic device (e.g., the electronic device 100 of FIG. 1) may output a first function execution screen. According to an embodiment, the first function execution screen may be a screen in which items are classified as a first class. Alternatively, the first function execution screen may be a screen in which a screen is divided into a first layout. The first class may be the first priority class in order. In addition, the first layout may be the first priority layout.

According to various embodiments, if an input for changing a screen output state is received in operation 330, the electronic device may analyze the input. According to an embodiment, the electronic device may analyze a type, location, size, duration time, or the like of the input. For example, in the case where a pinch gesture input is received, the electronic device may recognize that the input is the pinch gesture input and may analyze locations of input points of the pinch gesture, a distance between the input points, an input duration time, or the like.

According to various embodiments, if the input is (e.g., a two-finger pinch gesture input) associated with the classification function of items and the location of the input is received, the electronic device may designate an item output to the location of the input or an item output to a location, which is adjacent to the location of the input, to a target item. Alternatively, in the case where there is no item output to the location of the input, the electronic device may designate an item associated with an application, which is currently activated, as the target item. If the target item is designated, the electronic device may determine items having attributions, which is the same as or similar to the target item, as the target items.

In operation 350, the electronic device may provide a preview associated with the first priority class or a preview associated with the first priority layout. According to an embodiment, the electronic device may output a preview associated with the first priority class or a preview associated with the first priority layout on a display (e.g., the display 170 of FIG. 1). According to various embodiments, the first priority class may be designated as a top-level class, a bottom-level class, or a current output class (e.g., a class corresponding to classification states of the items before the input is received). Also, the first priority layout may be designated to a minimum division layout (e.g., a layout of a state where a screen is not divided), a maximum division layout (e.g., a layout of a state where a screen is divided into subscreens of the maximum number (e.g., five) to which a screen is set), a current layout (e.g., a layout before the input is received).

According to various embodiments, if the movement range between classes with respect to classification states of the items is designated according to a type, location, size, duration time, or the like of the input with a preview associated with the first priority class provided, the electronic device may sequentially provide a preview associated with the class included in the movement range. For example, if the movement range is designated to the N-th operation, the electronic device may output, on the display, previews of the class from the first priority class to the (N+1)-th priority class. According to various embodiments, while the preview of the (N+1)-th priority class is provided, the electronic device may provide previews from the (N+1)-th priority class to the first priority class. In addition, if the movement range between layouts associated with a screen division state is designated according to a type, location, size, duration time, or the like of the input while a preview associated with the first priority layout is provided, the electronic device may sequentially provide a preview associated with the class included in the movement range.

In operation 370, if the input ends, the electronic device may determine whether a screen output state change is generated. According to an embodiment, in the case where the change rate of the size (e.g., the change rate of the distance between input points of a pinch gesture input) of the input is not greater than a designated size, the electronic device may not designate the movement range. In this case, the electronic device may determine that the class change or the layout change is not generated. According to an embodiment, in the case where the class change or the layout change is not generated, the electronic device may not change classification states of the items or a screen division state and may end the output of a preview output on the display.

According to various embodiments, in the case where the movement range is designated while the change rate of a size of the input is greater than the designated size, the electronic device may determine that the class change or the layout change is generated. In this case, in operation 390, the electronic device may end the output of a preview output on the display and may display items classified according to the selected second class or may divide a screen based on the selected second layout. According to an embodiment, the second class may be a class to which an operation is applied (or, moves according to a class) from the first class by the movement range. For example, in the case where the first class is the first priority class and where the movement range is designated to the N-th operation, the second class may be the (N+1)-th priority class. In addition, the second layout may be a layout to which an operation is applied from the first layout by the movement range. For example, in the case where the first layout is the first priority layout and where the movement range is designated to the N-th operation, the second layout may be the (N+1)-th priority layout.

Referring back to operation 310, the electronic device may display relevant items without distinguishing a class instead of displaying items classified according to the first class. In this case, if the target items are determined, the electronic device may set a type of class based on types of the target items or user configuration information. When each of the target items includes time information, the electronic device may set the class to a year, month, week, or day unit and may respectively classify the target items into classes based on the generated or stored time of the items. Alternatively, in the case where the target items are a file or folder, the electronic device may set the class to a storage path and may respectively classify the target items into classes based on the set storage path. Accordingly, in operations 350 to 390, the electronic device may perform operations with respect to the set classes.

As described above, the electronic device may provide a preview associated with a class or layout in response to the input, thereby making it possible for a user to intuitively verify classification states of the items according to a specific class or a screen division state according to a specific layout. Furthermore, in the case where the input ends while the preview of a desired class or the preview of a desired layout is provided, the electronic device may classify the items based on the selected class or to divide a screen based on the selected layout, thereby easily performing a movement between classes to a desired class or a screen division to a desired layout.

Figure 4:
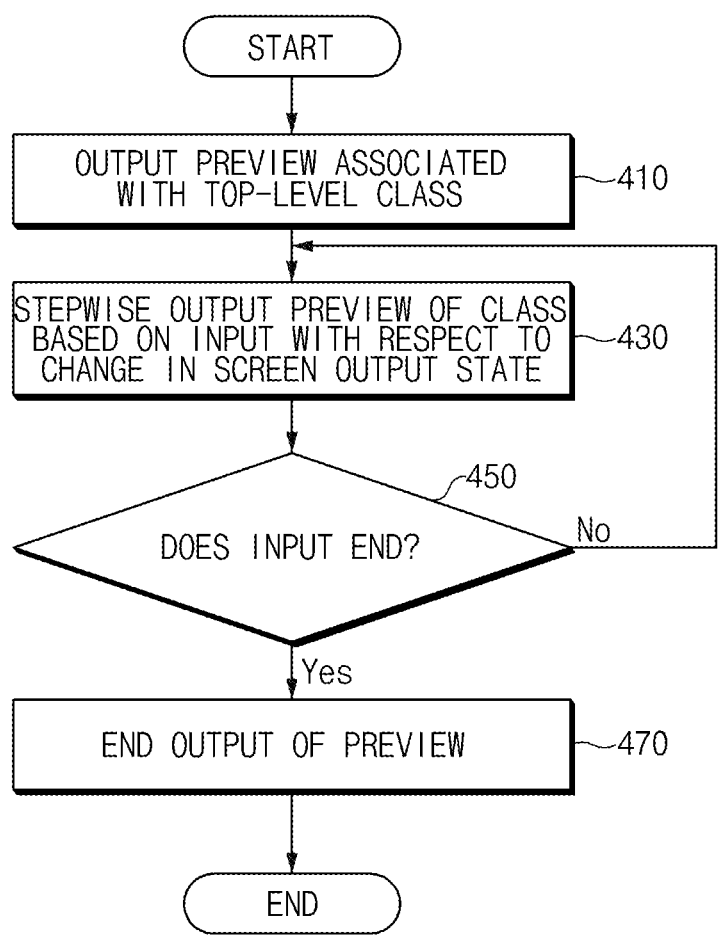
FIG. 4 illustrates a method for providing a preview of a top-level class, according to various embodiments of the present disclosure.

FIG. 4 illustrates a method for providing a preview of a top-level class, according to various embodiments of the present disclosure.

Referring to FIG. 4, the electronic device (e.g., the electronic device 100 of FIG. 1) may designate a top-level class as the first priority class. In addition, the electronic device may designate a lower class, which is lower than the top-level class by the N-th operation, as the (N+1)-th priority class. For example, in the case where a class is classified in the order of units of year, month, week, and day, the electronic device may designate a year class being the top-level class as the first priority class, may designate a month class, which is lower than the year class by the first operation, as the second priority class, may designate a week class, which is lower than the year class by the second operation, as the third priority class, and may designate a day class, which is lower than the year class by the third operation, as the fourth priority class. Alternatively, the electronic device may designate the bottom-level class as the first priority class. In this case, the electronic device may designate an upper class, which is higher than the bottom-level class by the N-th operation, as the (N+1)-th priority class.

According to various embodiments, if an input for changing a screen output state is received and the input is associated with the classification function of items, the electronic device may provide the preview of the first priority class. For example, as illustrated in operation 410, the electronic device may output a preview associated with the top-level class on a display (e.g., the display 170 of FIG. 1).

In operation 430, the electronic device may stepwise output the preview of the class based on the input with respect to a class change. For example, the electronic device may designate the movement range between classes based on a type, location, size, duration time, or the like of the input and may sequentially output the preview of the class, which is included in the movement range, on the display. For example, if the movement range is designated to the second operation, the electronic device may sequentially output the preview of the first priority class, the preview of the second priority class, and the preview of the third priority class on the display. In another example, in the case where the size of the input increases, the electronic device may sequentially output a preview from a high priority class (e.g., the first priority class) to a low priority class (e.g., the third priority class). In the case where the size of the input decreases, the electronic device may sequentially output a preview from a low priority class to a high priority class.

In operation 450, the electronic device may determine whether the input ends. According to various embodiments, in the case where the input is a pinch gesture input, the electronic device may determine whether fingers corresponding to input points are divided from a touch screen. According to an embodiment, in the case where an input value received through an input interface (e.g., the input interface 110 of FIG. 1) decreases to be smaller than or equal to a designated size (in the case where there is nearly no input value), the electronic device may determine that the input ends.

According to various embodiments, in the case where the input does not end, the electronic device may return to operation 430 and may output the preview of the class on a display. According to various embodiments, in the case where the input ends, as illustrated in operation 470, the electronic device may end the output of the preview. Also, at a point in time when the input ends, the electronic device may classify items based on the selected class and may display the classified items.

Figure 5:
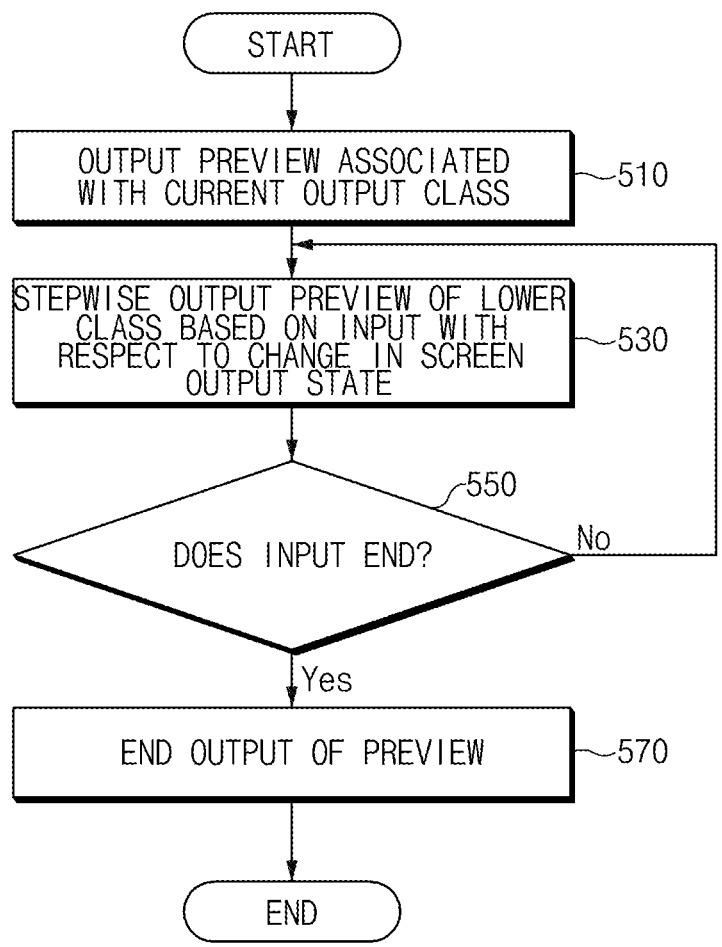
FIG. 5 illustrates a method for providing a preview of a current output class, according to various embodiments of the present disclosure.

FIG. 5 illustrates a method for providing a preview of a current output class, according to various embodiments of the present disclosure.

According to various embodiments, the electronic device (e.g., the electronic device 100 of FIG. 1) may designate a current output class as the first priority class. Furthermore, the electronic device may designate a lower class, which is lower than the current output class by the N-th operation, as the (N+1)-th priority class. For example, in the case where a class is classified in the order of units of year, month, week, and day and a current output class is a month class, the electronic device may designate a month class to the first priority class, may designate a week class, which is lower than the month class by the first operation, as the second priority class, and may designate a day class, which is lower than the month class by the second operation, as the third priority class.

Referring to FIG. 5, in operation 510, if an input for changing a screen output state is received and the input is associated with the classification function of items, the electronic device may output a preview associated with the current output class being the first priority class on a display (e.g., the display 170 of FIG. 1). In operation 530, the electronic device may stepwise output the preview of a lower class based on the input with respect to a class change. For example, the electronic device may designate the movement range between classes based on a type, location, size, duration time, or the like of the input and may sequentially output the preview of the class, which is included in the movement range, on the display.

Operations 550 to 570 may be performed the same as or similar to operations 450 to 470 in FIG. 4. For example, in operation 550, the electronic device may determine whether the input ends. In the case where the input does not end, the electronic device may return to operation 530. In addition, in the case where the input ends, in operation 570, the electronic device may end the output of a preview.

According to various embodiments, in operation 530, the electronic device may output a preview associated with an upper class of the current output class instead of outputting a preview associated with a lower class of the current output class, based on the movement range. According to an embodiment, in the case where the size of the input increases, the electronic device may output the preview of the lower class. In the case where the size of the input decreases, the electronic device may output the preview of the upper class.

According to various embodiments, in the case where the size of the input decreases, the electronic device may designate the upper class, which is higher than the current output class by the N-th operation, as the (N+1)-th priority class. For example, in the case where a class is classified in the order of units of year, month, week, and day and where the current output class is a month class, the electronic device may designate a year class, which is higher than a month class by the first operation, as the second priority class.

As described above, the electronic device may provide the preview of the current output class first in response to the input associated with the classification function of items, thereby making it possible to quickly verify a preview associated with an upper or lower class of the current output class. For example, in the case where the number of the class operations is greater than the designated number because the hierarchical structure of the items is complicated, a plurality of operations should be performed to verify the preview of a specific class in response to the input if the preview of a top-level class or bottom-level class is provided first. Accordingly, the electronic device may provide the preview of the current output class first and may sequentially provide the preview of an upper or lower class of the current output class, thereby reducing the number of operations to be performed to verify the preview of a specific class.

However, in the case where a movement range between the specific class and the current output class is greater than a movement range between the specific class and the top-level class or the bottom-level class, the number of operations to be performed may increase. Accordingly, in the case where a class change with respect to classification states of the items is performed first, the electronic device may provide the preview of the top-level class or bottom-level class first, and in the case where the class change is performed later, the electronic device may selectively provide a preview. A detailed description thereof will be described with reference to FIG. 6.

Figure 6:
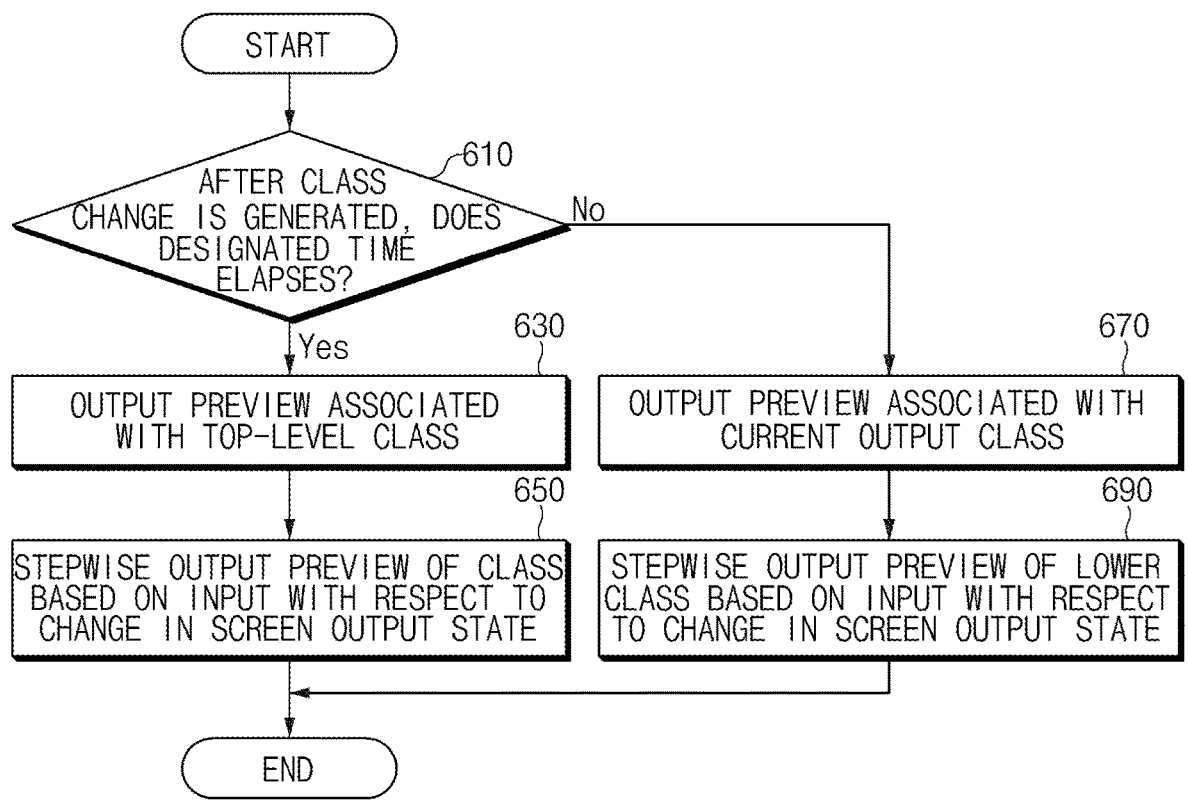
FIG. 6 illustrates a method for providing a preview in response to an input, according to various embodiments of the present disclosure.

FIG. 6 illustrates a method for providing a preview in response to an input, according to various embodiments of the present disclosure.

Referring to FIG. 6, after a class change is performed while an input is received for changing a screen output state associated with the classification function of items, in operation 610, the electronic device (e.g., the electronic device 100 of FIG. 1) may determine whether a designated time elapses after the class change.

If an input for changing classification states of the items is again receiving in the case where the designated time elapses after the class change, the electronic device may perform operations the same as or similar to operations 410 to 430 of FIG. 4. For example, in operation 630, the electronic device may output a preview associated with a top-level class first. In addition, in operation 650, the electronic device may stepwise output the preview of the class based on the input with respect to a class change.

If an input associated with the classification function of the items is again receiving in the case where the designated time does not elapse after the class change, the electronic device may perform operations the same as or similar to operations 510 to 530 of FIG. 5. For example, in operation 670, the electronic device may output a preview associated with a current output class first. In addition, in operation 690, the electronic device may stepwise output a preview associated with a lower class of the current output class based on the input with respect to a class change.

As described above, the electronic device may selectively provide a preview by using a time difference between the regenerated input associated with the classification function of the items and a previously generated input, thereby making it possible for a user to quickly verify a preview associated with an upper or lower class of the current output class.

Figure 7A:
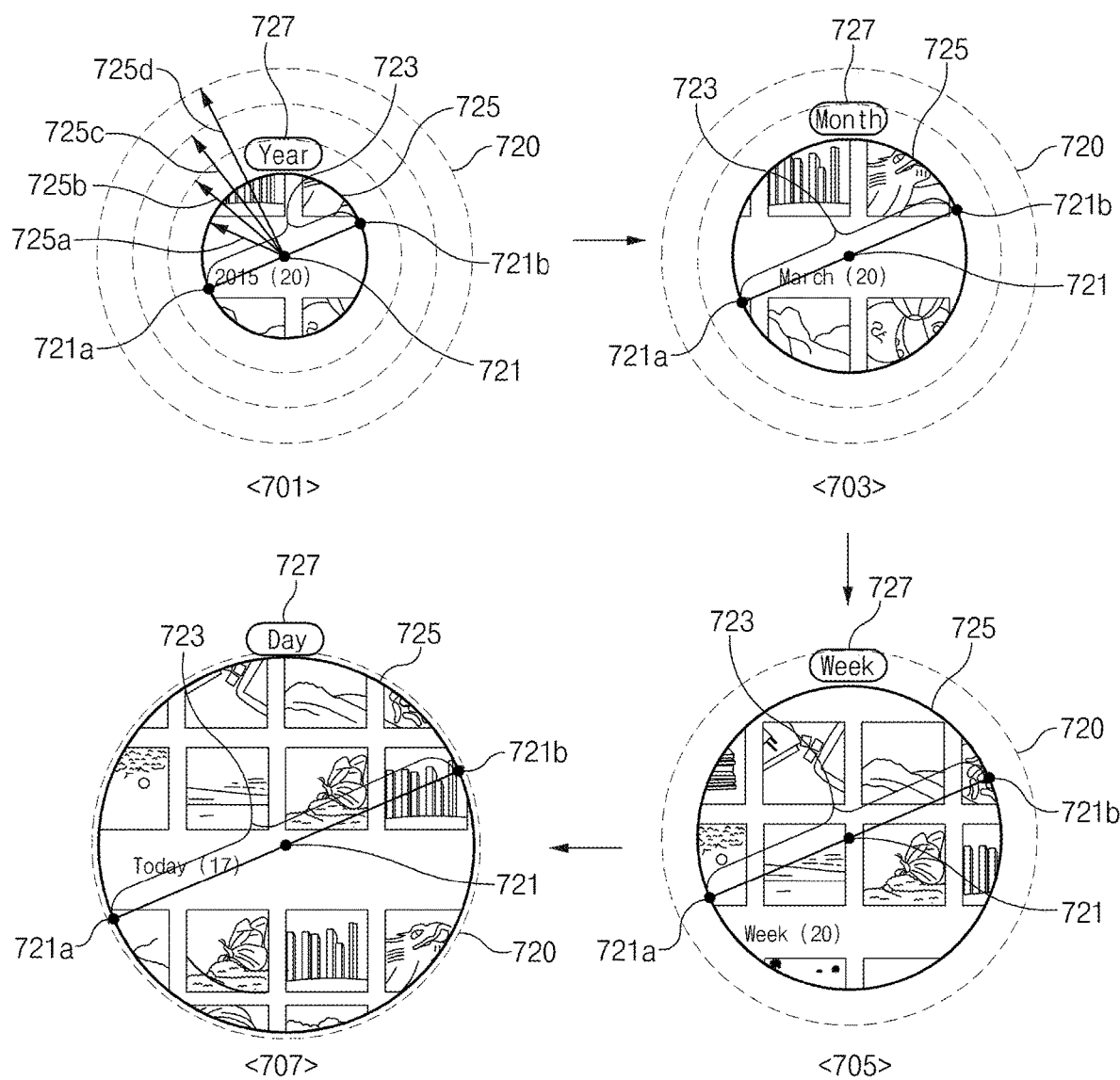
FIG. 7A illustrates a view for describing a preview, according to various embodiments of the present disclosure.

FIG. 7A illustrates a view for describing a preview, according to various embodiments of the present disclosure.

Referring to FIG. 7A, a preview output area 720 may be differently designated according to a type, location, or the like of an input associated with the classification function of items. According to an embodiment, the preview output area 720 may be designated in the form of a ring about the location of the input. According to various embodiments, the form of the preview output area 720 is not limited thereto. For example, the preview output area 720 may be designated in the form of a polygon (e.g., a quadrangle) or the like.

According to various embodiments, if the input is received, the electronic device (e.g., the electronic device 100 of FIG. 1) may analyze a type, location, size, duration time, or the like of the input. In embodiments described below, the case where a type of the input is a pinch gesture input will be described. According to various embodiments, if the type of the input is the pinch gesture input, the electronic device may verify input points (a first point 721*a* and a second point 721*b*) of the pinch gesture input. In addition, the electronic device may calculate a center point 721 of the input points.

According to various embodiments, as illustrated in a first state 701, the electronic device may output a circular preview 725, of which the diameter is a distance between the first point 721*a* and the second point 721*b*, about the center point 721, on a display (e.g., the display 170 of FIG. 1). According to various embodiments, the electronic device may output a text 727 or the like corresponding to the class on the display together with the circular preview 725. For example, illustrated is a case where the electronic device outputs the text 727 to an upper portion of area of the circular preview 725. According to various embodiments, the electronic device may output the text 727 or/and an image or the like corresponding to the class to be adjacent to the circular preview 725.

According to various embodiments, the electronic device may designate the movement range between classes with respect to classification states of the items based on a type, location, size, duration time, or the like of the input. According to an embodiment, the electronic device may designate the movement range based on a distance 723 (i.e., interval) between the first point 721*a* and the second point 721*b*. Alternatively, the electronic device may designate the movement range based on a distance between the center point 721 and one point among the input points. For example, the electronic device may designate the movement range to the first operation in the case where the distance between the center point 721 and the one point is greater than or equal to a first size 725*a* or is smaller than a second size 725*b*, may designate the movement range to the second operation in the case where the distance is greater than or equal to a second size 725*b* or is smaller than a third size 725*c*, and may designate the movement range to the third operation in the case where the distance is greater than or equal to a third size 725*c* or is smaller than a fourth size 725*d*.

According to various embodiments, in the case where the distance between the center point 721 and the one point is smaller than the first size 725*a*, the electronic device may not designate the movement range. In addition, in the case where the distance between the center point 721 and the one point is greater than or equal to the fourth size 725*d*, the electronic device may maintain the movement range with the third operation. According to various embodiments, the number of operations of the movement range may be differently set according to the number of classes of the items. For example, in the case where the number of classes of the items is total 'N', the electronic device may designate the movement range to total 'N−1' operations. For example, illustrated is a case where the number of classes of the items is four. Accordingly, the electronic device may designate the movement range to total three operations.

According to various embodiments, if the movement range is designated, the electronic device may sequentially provide the circular preview 725 associated with a class included in the movement range. For example, if the movement range is designated to the N-th operation, the electronic device may output the changed circular preview 725. According to various embodiments, the electronic device may output a preview associated with the (N+M)-th priority class to be relatively greater than a preview associated with the M-th priority class. According to various embodiments, the electronic device may output a preview associated with the (N+M)-th priority class to be greater than a preview associated with the M-th priority class by the size of an input corresponding to the movement range of the N-the operation. For example, the electronic device may output a preview associated with the second priority class to be greater than a preview associated with the first priority class by the size (e.g., the size obtained by subtracting a first size 725*a* from a second size 725*b*) of an input corresponding to the movement range of the first operation. In another example, in the case where the size of the input increases, the electronic device may sequentially output a preview from a high priority class (e.g., the first priority class) to a low priority class (e.g., the fourth priority class). However, in the case where the size of the input decreases, the electronic device may sequentially output a preview from the low priority class to the high priority class. Accordingly, the electronic device may output the reduced size of the circular preview 725. According to various embodiments, while sequentially changing the circular preview 725 based on the class, the electronic device may also change the text 727 corresponding to the class.

A first state 701 illustrates the case where the items are classified while the class is set to a year, month, week, and day unit. For example, in the case where a year class, a month class, a week class, and a day class are respectively set to the first priority class, the second priority class, the third priority class, and the fourth priority class, the electronic device may output a preview associated with the year class being the first priority class as the circular preview 725 on the display if the input is received. Furthermore, if the movement range is set to the third operation, the electronic device may sequentially output the preview of each class from a second state 703 to a fourth state 707. For example, after sequentially changing the circular preview 725 into a preview associated with the month class, a preview associated with the week class, and a preview associated with the day class, the electronic device may output the changed circular preview 725.

As described above, it is described that the movement range is designated to one operation (e.g., the first operation) or a plurality of operations. In addition, in the case where the movement range is designated to a plurality of operations, a method of sequentially providing a preview associated with a class included in the movement range is described. However, the method of providing a preview is not limited thereto. According to various embodiments, the electronic device may designate the movement range step by step many times instead of designating the movement range to a plurality of operations. For example, the electronic device may provide the preview of the class in real time at a point in time when a distance of the input points is changed to be greater than or equal to a designated size (e.g., a size corresponding to one operation). The method may be identically applied to various embodiments described in the present disclosure.

Figure 7B:
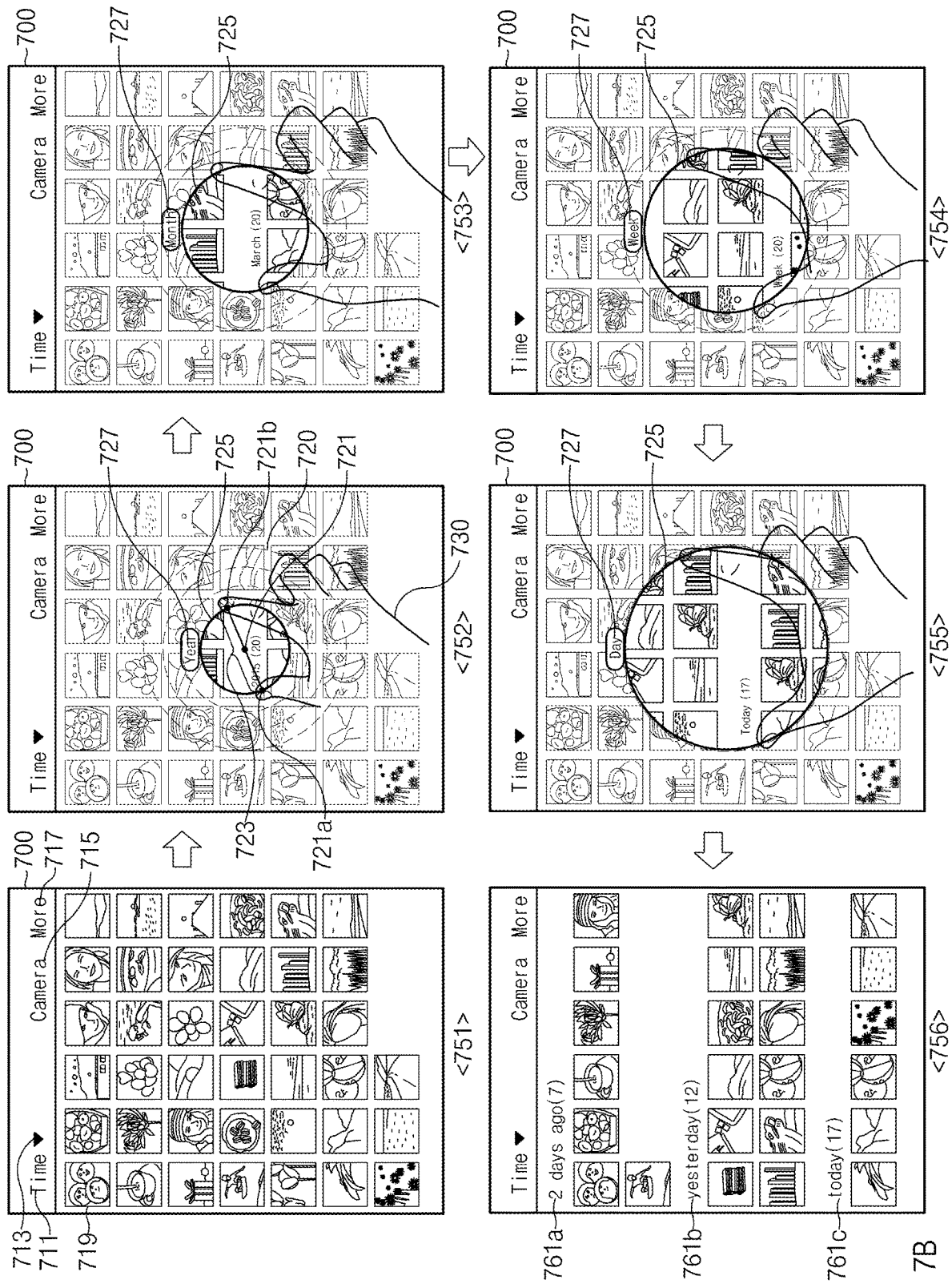
FIG. 7B illustrates a view for describing class change processing, according to various embodiments of the present disclosure.

FIG. 7B illustrates a view for describing class change processing, according to various embodiments of the present disclosure.

Referring to FIG. 7B, as illustrated in a fifth state 751, the electronic device (e.g., the electronic device 100 of FIG. 1) may output the execution screen of a specific application such as an album application execution screen 700 on a display (e.g., the display 170 of FIG. 1).

The album application execution screen 700 may be displayed with picture files 719 (or media files) stored in a memory (e.g., the memory 150 of FIG. 1) arranged in the form (e.g., a lattice form). Moreover, the album application execution screen 700 may further include a class type selection button 711, a class selection button 713, a camera application execution button 715, an additional function button 717, and the like.

The class type selection button 711 may select a type of class associated with the classification state of the picture files 719. For example, if the class type selection button 711 is selected, the electronic device may output sub-buttons corresponding to types of selectable classes (e.g., a generation time, storage time, storage path, or the like) on the album application execution screen 700. In this case, if a specific sub-button of the sub-buttons is selected, the electronic device may change a type of class, which is currently set, into a type of class corresponding to the selected sub-button. According to an embodiment, the class type selection button 711 may include a text (e.g., "Time"), image, or the like indicating a type of class that is currently set.

The class selection button 713 may select a current output class associated with the classification states of the picture files 719 based on a type of class that is currently set. For example, if the class selection button 713 is selected, the electronic device may output sub-buttons corresponding to a selectable class on the album application execution screen 700. In this case, after classifying the picture files 719 as a class corresponding to the selected sub-button if a specific sub-button of the sub-buttons is selected, the electronic device may display the picture files 719. According to an embodiment, the class selection button 713 may include a text, image, or the like indicating the current output class.

The camera application execution button 715 may enable a camera application. For example, if the camera application execution button 715 is selected, the electronic device may perform the camera application.

The additional function button 717 may perform an additional function that an album application supports. For example, if the additional function button 717 is selected, the electronic device may perform an additional function that an album application supports. For example, illustrated is a case where the additional function button 717 is configured to output picture files, which is not currently output, in addition to the picture files 719 output on the album application execution screen 700.

According to various embodiments, as illustrated in a sixth state 752, if an input (e.g., a pinch gesture input 730) associated with the classification function of the picture files 719 is received, the electronic device may output the circular preview 725 on the preview output area 720. According to an embodiment, the preview output area 720 may be a circular area that has a diameter of a specific size about the center point 721 of input points (e.g., a first input point 721a and a second point 721b) of the pinch gesture input 730. According to various embodiments, the electronic device may output the circular preview 725, of which the diameter is a distance 723 of the input points, about the center point 721 on the preview output area 720. Furthermore, the electronic device may output the text 727 or the like corresponding to the class to be adjacent to the circular preview 725.

According to various embodiments, a seventh state 753, an eighth state 754, and a ninth state 755 may be the same as or similar to the second state 703, the third state 705, and the fourth state 707 of FIG. 7A, respectively. For example, the electronic device may designate a movement range between classes based on the size of the change in the distance 723 between the input points and may sequentially output the preview of a class included in the movement range.

According to various embodiments, the electronic device may output the circular preview 725 on an upper layer of the execution screen (e.g., the album application execution screen 700) of a specific application. In addition, when outputting the circular preview 725 on the display, the electronic device may dim or blur the execution screen below the circular preview 725. For example, while the circular preview 725 is output on the display (e.g., the sixth state 752, the seventh state 753, the eighth state 754, and the ninth state 755), the electronic device may dim the album application execution screen 700.

According to various embodiments, if the pinch gesture input 730 ends (e.g., if fingers corresponding to the input points are divided from a touch screen), as illustrated in a tenth state 756, the electronic device may output the picture files 719 after classifying the picture files 719 based on the selected class. According to an embodiment, the electronic device may display the picture files 719 on the album application execution screen 700 after arranging the picture files 719 that are classified according to the selected class. For example, the electronic device may display the picture files 719 on the album application execution screen 700 after arranging the picture files 719, which is classified into a first item 761a, a second item 761b, a third item 761c, and the like of the class. For example, illustrated is a state in which a day class is selected as the class and the first item 761a, the second item 761b, and the third item 761c are respectively set to two days ago, one day before (yesterday), and the day (today). Accordingly, the electronic device may classify picture files (e.g., picture files are generated or stored two days ago), which correspond to the first item 761a, from among the picture files 719, picture files (e.g., picture files are generated or stored one day ago), which correspond to the second item 761b, from among the picture files 719, and picture files (e.g., picture files are generated or stored on that day), which correspond to the third item 761c, from among the picture files 719. The electronic device may display the classified picture files on the album application execution screen 700 after arranging the classified picture files.

Figure 8:
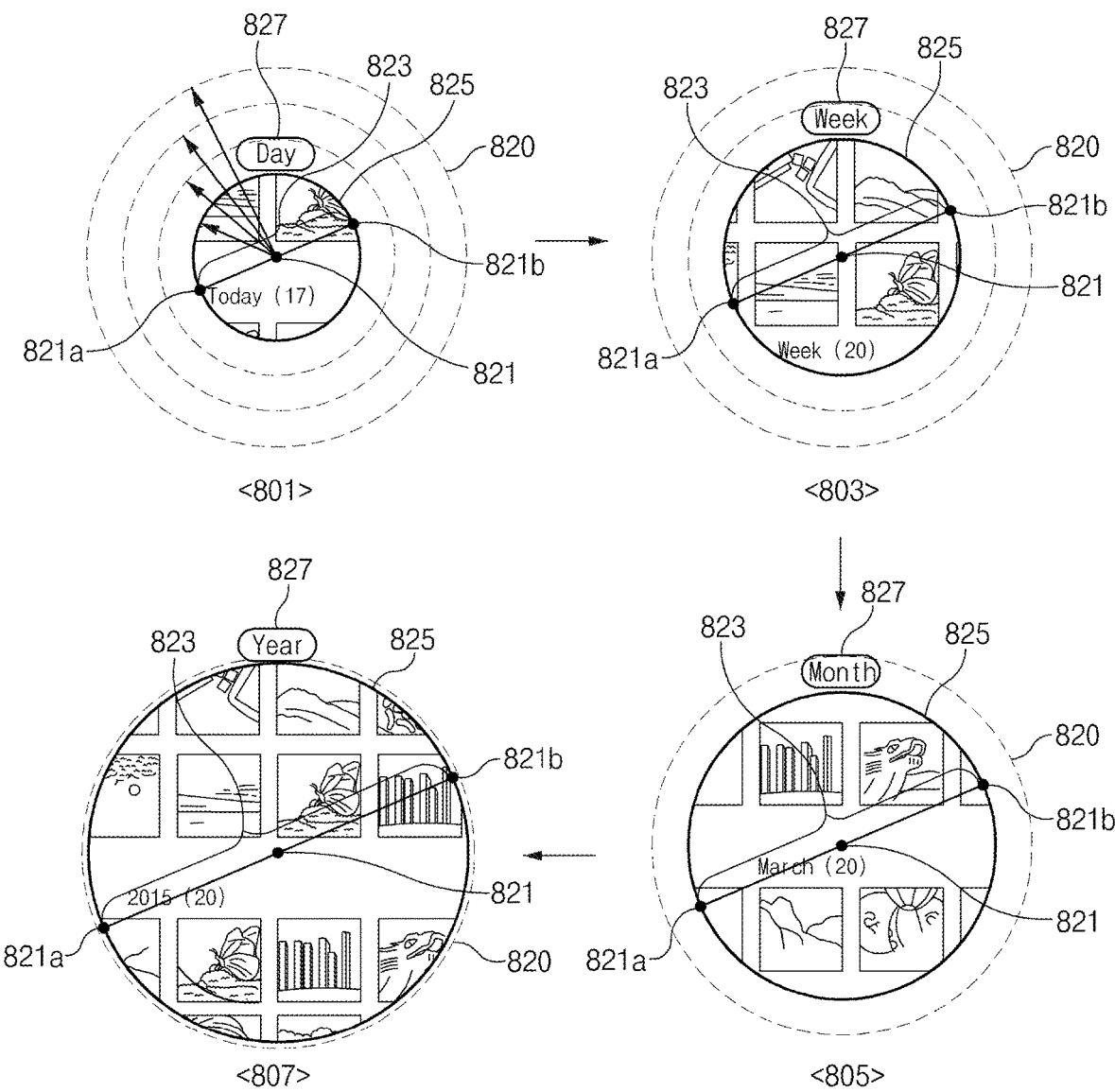
FIG. 8 is a view for describing an order of a class to be provided as a preview, according to various embodiments of the present disclosure.

FIG. 8 is a view for describing an order of a class to be provided as a preview, according to various embodiments of the present disclosure.

According to various embodiments, the electronic device (e.g., the electronic device 100 of FIG. 1) may designate the class order of the items based on a type of items or user configuration information. According to an embodiment, in the case where each of the items includes time information, the electronic device may designate the class order in the order of units of year, month, week, and day or may designate the class order in the order of units of day, week, month, and year. FIGS. 7A and 7B illustrate a designated state in which the class order of the items is designated in the order of units of year, month, week, and day. In FIG. 8, a state in which the class order is designated in the order of units of day, week, month, and year will be described.

Referring to FIG. 8, if an input associated with the classification function of the items is received, as illustrated in a first state 801, the electronic device may output a circular preview 825, of which the diameter is a distance 823 between the input points, about a center point 821 of input points (e.g., a first input point 821a and a second input point 821b) on a preview output area 820. In this case, the electronic device may provide a preview associated with a day class being the first priority class as the circular preview 825 first. Also, if the size of the input is changed and the movement range between classes is designated, the electronic device may sequentially output the preview of a class included in the movement range. As illustrated in FIG. 8, the electronic device may sequentially output the preview of each class from the first state 801 to the second state 803, third state 805, and fourth state 807. For example, the electronic device may sequentially output the circular preview 825 from a day class being the first priority class to a week class being the second priority class, a month class being the third priority class, and a year class being the fourth priority class. In addition, the electronic device may output a text 827 or the like corresponding to the class on the display together with the circular preview 825.

Figure 9:
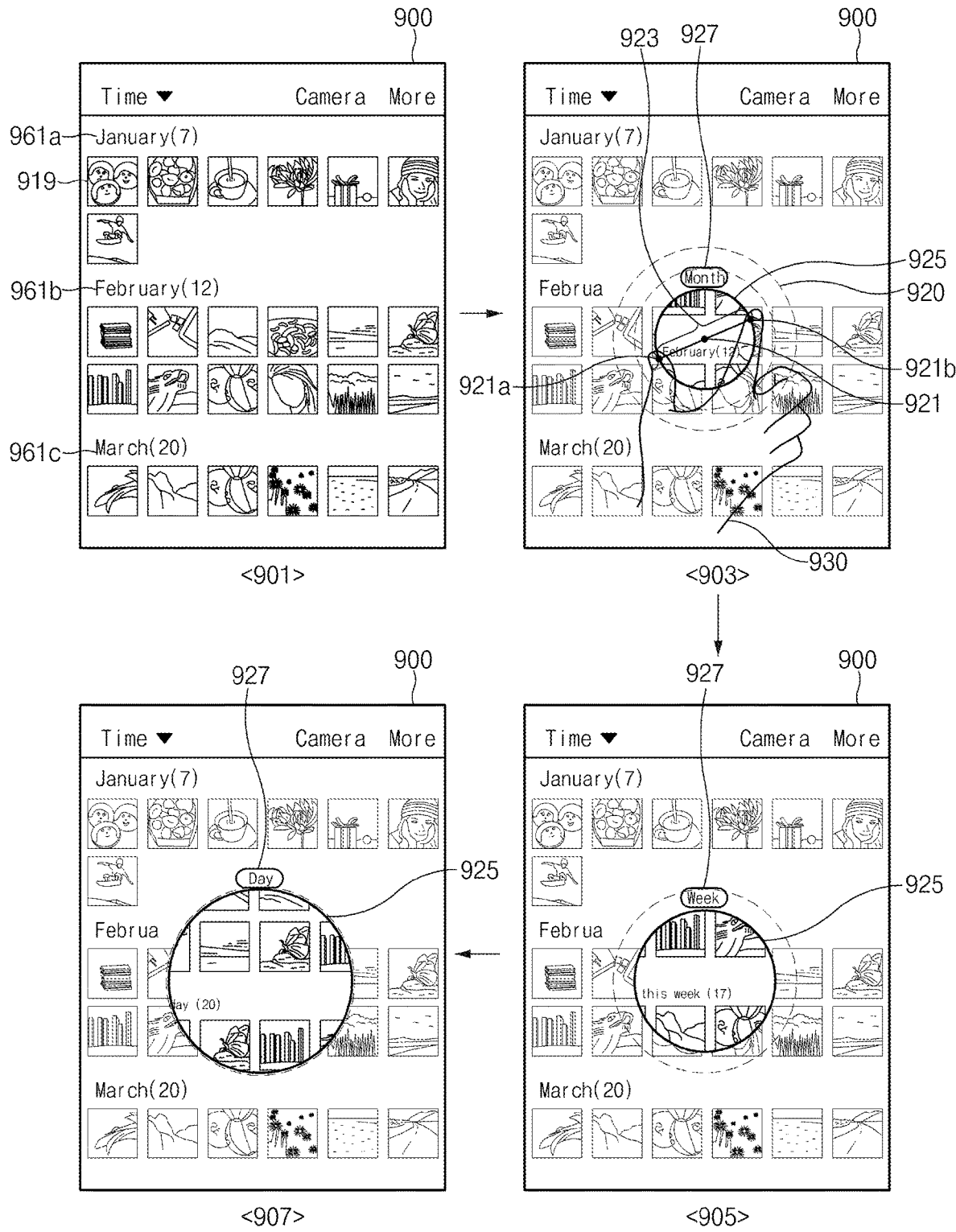
FIG. 9 is a view for describing providing of a preview of a current output class in response to an input associated with a screen output state change, according to various embodiments of the present disclosure.

FIG. 9 is a view for describing providing of a preview of a current output class in response to an input associated with a screen output state change, according to various embodiments of the present disclosure.

According to various embodiments, as illustrated in FIGS. 7A and 7B, the electronic device (e.g., the electronic device 100 of FIG. 1) may designate the top-level class (e.g., a year class) to the first priority class and may designate lower classes of the top-level class as low priority classes. Alternatively, as illustrated in FIG. 8, the electronic device may designate the bottom-level class (e.g., a day class) as the first priority class and may designate upper classes of the bottom-level class as low priority classes. However, the method of designating the class order is not limited thereto. A method in which a current output class is designated as the first priority class and provided as a preview will be described with reference to FIG. 9.

Referring to FIG. 9, the electronic device may output the execution screen of a specific application on a display (e.g., the display 170 of FIG. 1). According to an embodiment, as illustrated in a first state 901, the electronic device may output an album application execution screen 900 on the display. According to various embodiments, picture files 919 included in the album application execution screen 900 may be may be displayed after being classified according to a specific class. For example, illustrated is a state in which the picture files 919 are classified as a month class. For example, the electronic device may classify the picture files 919, which are generated or stored in the same or similar months, as a specific item included in the month class. For example, the electronic device may respectively classify the picture files 919 associated with an album application (or stored in a memory (e.g., the memory 150 of FIG. 1)) into picture files (e.g., picture files are generated or stored on January) corresponding to a first item 961a, picture files (e.g., picture files are generated or stored on February) corresponding to a second item 961b, and picture files (e.g., picture files are generated or stored on March) corresponding to a third item 961c. The electronic device may display the classified picture files 919 on the album application execution screen 900.

According to various embodiments, if an input (e.g., a pinch gesture input 930) associated with the classification function of the picture files 919 is received, as illustrated in a second state 903, the electronic device may output the circular preview 925, of which the diameter is a distance 923 between the input points, about a center point 921 of input points (e.g., a first input point 921a and a second input point 921b) on a preview output area 920. In addition, the electronic device may output a text 927 or the like corresponding to the class on the display to be adjacent to the preview 925.

According to various embodiments, if the input is received, the electronic device may output the preview 925 associated with a month class being a current output class (e.g., one of classes corresponding to the classification states of the picture files 919 before the input is received) on the display. For example, the electronic device may designate the current output class as the first priority class and may output a preview associated with the current output class on the display based on the designated result in response to the input.

According to various embodiments, if the current output class is designated as the first priority class, the electronic device may differently designate a low priority class based on whether the size of the input increases or decreases. According to an embodiment, if the size of the input increases (e.g., if the distance 923 between the input points increases), the electronic device may designate a lower class of the current output class as a low priority class in order. For example, the electronic device may designate a week class as the second priority class and may designate a day class as the third priority class. In addition, if the size of the input decreases (e.g., if the distance 923 between the input points decreases), the electronic device may designate an upper class of the current output class as a low priority class in order. For example, the electronic device may designate a year class as the second priority class. For example, illustrated is a case where the size of the input increases. As illustrated in FIG. 9, the size of the input increases by the first size, as illustrated in a third state 905, and the electronic device may designate the second priority class as a week class, may change the preview 925 into a preview associated with the week class based on the designated result, and may output the changed preview on the display. In addition, after changing the text 927 corresponding to the class into a text (e.g., "Week") corresponding to the week class, the electronic device may output the changed text.

According to various embodiments, the size of the input increases by the second size, as illustrated in a fourth state 907, and the electronic device may designate the third priority class as a day class, may change the preview 925 into a preview associated with the day class based on the designated result, and may output the changed preview on the display. Moreover, after changing the text 927 corresponding to the class into a text (e.g., "Day") corresponding to the day class, the electronic device may output the changed text.

Figure 10:
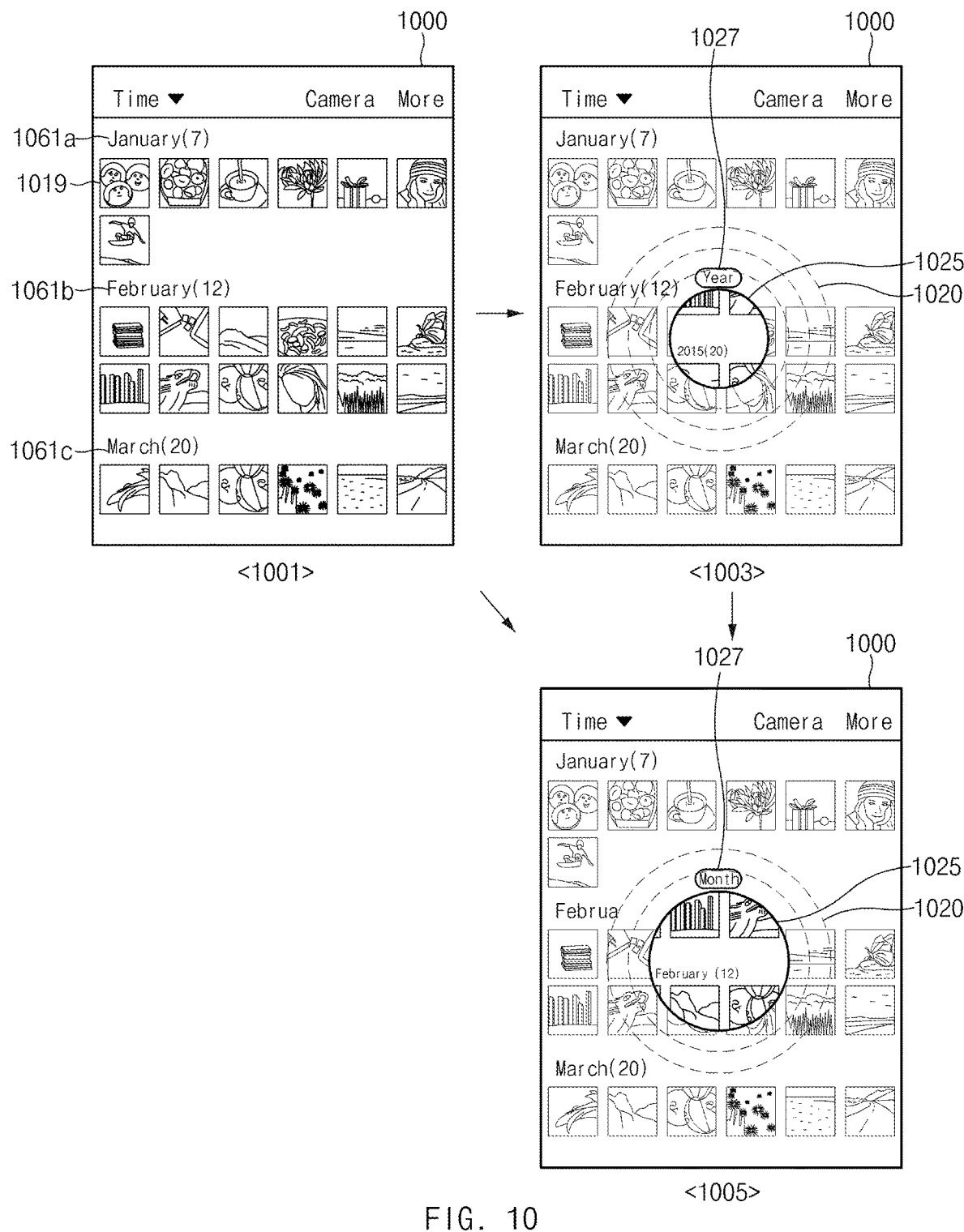
FIG. 10 is a view for describing selective providing of a preview in response to an input associated with a screen output state change, according to various embodiments of the present disclosure.

FIG. 10 is a view for describing selective providing of a preview in response to an input associated with a screen output state change, according to various embodiments of the present disclosure.

Referring to FIG. 10, as illustrated in a first state 1001, after the execution screen (e.g., items (e.g., picture files 1019) included in an album application execution screen 1000) of a specific application is classified according to a specific class (e.g., a month class), the execution screen may be displayed. For example, the items may be respectively classified into items corresponding to a first item 1061a included in the specific class, items corresponding to a second item 1061b included in the specific class, and items corresponding to a third item 1061c included in the specific class, may be arranged, and may be displayed on the execution screen of the specific application.

According to various embodiments, while a first state 1001 is classified as the specific class according to a first input associated with the classification function of the items, the electronic device may differently provide a preview 1025 based on an elapsed time from a point in time when the first input ends (e.g., a point in time when the class change is completed) if a second input associated with the classification function of the items is received. According to an embodiment, in the case where the elapsed time is greater than a designated time, as illustrated in a second state 1003, the electronic device may output the preview 1025 in the preview output area 1020 as a preview associated with the top-level class (e.g., a year class) or the bottom-level class (e.g., a day class). According to an embodiment, in the case where the elapsed time is not greater than the designated time, as illustrated in a third state 1005, the electronic device may output the preview 1025 as a preview associated with a current output class. Also, the electronic device may output a text 1027 corresponding to the class together with the preview 1025 to be adjacent to the preview 1025.

As described above, the electronic device may selectively provide a preview by using a time difference between the first input and the second input, thereby making it possible for a user to quickly verify a preview associated with a specific class.

Figure 11:
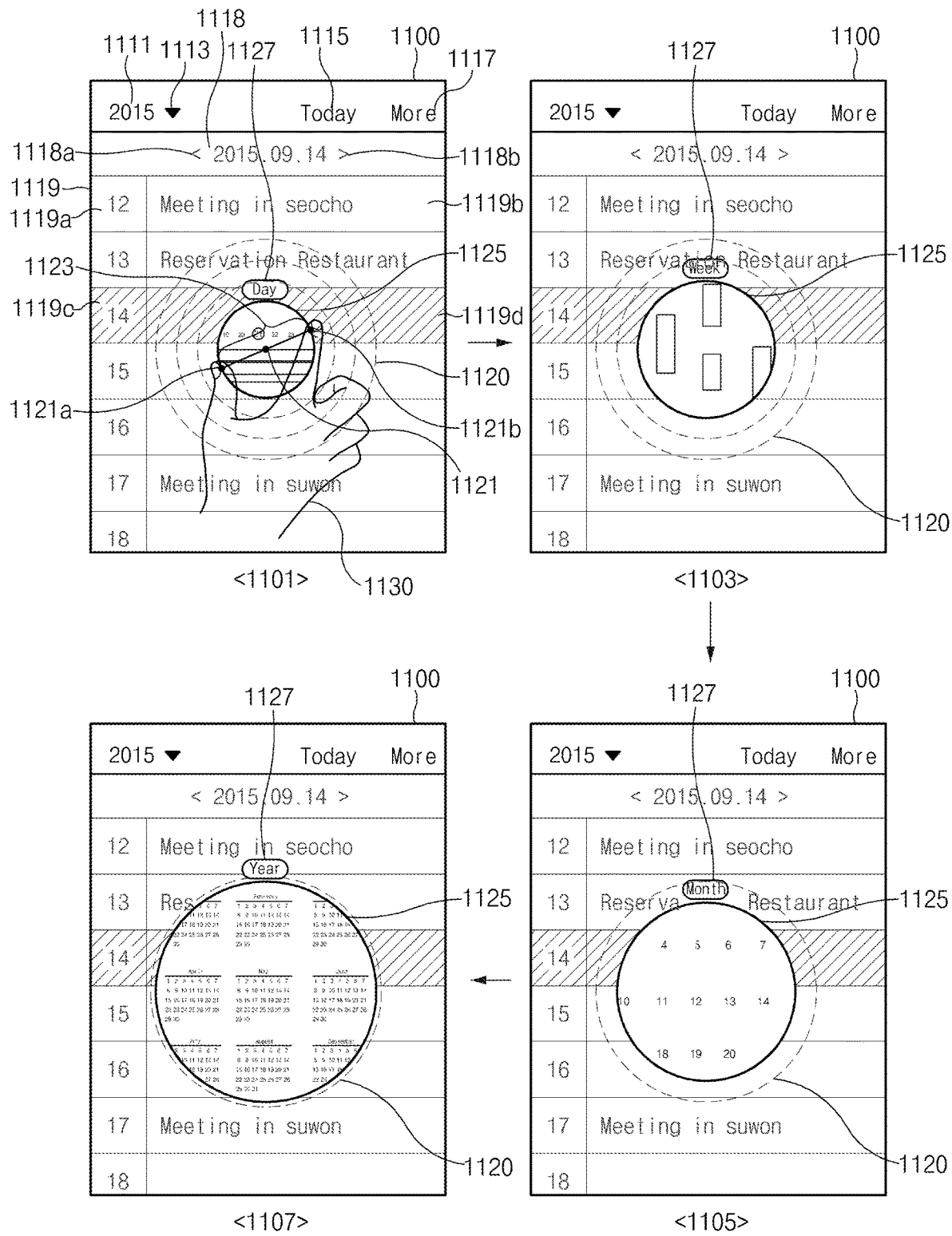
FIG. 11 illustrates a view associated with a class change at a schedule management application, according to various embodiments of the present disclosure.

FIG. 11 illustrates a view associated with a class change at a schedule management application, according to various embodiments of the present disclosure.

Referring to FIG. 11, as illustrated in a first state 1101, the electronic device (e.g., the electronic device 100 of FIG. 1) may output an execution screen 1100 of a schedule management application on a display (e.g., the display 170 of FIG. 1). For example, the schedule management application may manage a schedule list 1119 for each time by using a schedule information file stored in a memory (e.g., the memory 150 of FIG. 1).

According to various embodiments, after classifying schedule items included in the schedule list 1119 based on a designated class, the electronic device may display the schedule items. For example, after classifying time information 1119a and schedule content 1119b included in the schedule items based on a designated class, the electronic device may display the time information 1119a and the schedule content 1119b. For example, illustrated is a state in which the class is designated to a day unit and the electronic device displays schedule items after classifying the schedule items as a day class. According to various embodiments, the execution screen 1100 of the schedule management application may further include a class display object 1111 that is currently set, a class selection button 1113, a specific date selection button 1115, an additional function button 1117, a specific date display object 1118, and the like.

The class display object 1111 may display a text, an image, or the like corresponding to a current output class. For example, the class display object 1111 may display a text (e.g., "2015") indicating the year of a specific date but displays a text indicating a month, week, or day of the specific date.

The class selection button 1113 may select a current output class associated with classification state of the schedule items. For example, if the class selection button 1113 is selected, the electronic device may output sub-buttons corresponding to selectable classes on the execution screen 1100 of the schedule management application. In this case, if a specific sub-button of the sub-buttons is selected, the electronic device may display the schedule items after classifying the schedule items as a class corresponding to the selected sub-button. According to an embodiment, the class selection button 1113 may include a text, image, or the like indicating the current output class.

The specific date selection button 1115 may select a schedule item corresponding to a specific date and to display the selected schedule item to be different from other schedule items. For example, if the specific date selection button 1115 is selected, the electronic device may display the color, thickness, or size of a text, a background color, or the like of the schedule item corresponding to the specific date to be different from other schedule items. For example, illustrated is a state in which the specific date selection button 1115 is selected and the background color of time information 1119c and schedule content 1119d of the specific date are displayed to be different from other schedule items. According to various embodiments, when the specific date selection button 1115 is selected while a schedule item corresponding to the specific date is not displayed, after changing the arrangement state of the schedule items such that a schedule item corresponding to the specific date is placed in the specific area (e.g., a center area) of the display, the electronic device may display the changed arrangement state of the schedule items. For example, illustrated is a state in which the day (today) is set to the specific date.

The additional function button 1117 may perform an additional function that a schedule management application supports. For example, if the additional function button 1117 is selected, the electronic device may perform the additional function that the schedule management application supports. For example, illustrated is a case where the additional function button 1117 is set such that schedule items that are not currently output are output in addition to schedule items output on the execution screen 1100 of the schedule management application.

The specific date display object 1118 may display the set specific date. For example, the specific date display object 1118 may include a text, an image, or the like corresponding to the set specific date. According to various embodiments, the execution screen 1100 of the schedule management application may include a previous date selection button 1118*a* and a next date selection button 1118*b* to be adjacent to the specific date display object 1118. The previous date selection button 1118*a* may set a previous date of the specific date to the specific date. For example, if the previous date selection button 1118*a* is selected, the electronic device may set the specific date to a previous date and may display the schedule items after arranging the schedule items with respect to the previous date. The next date selection button 1118*b* may set the next previous date of the specific date to the specific date. For example, if the next date selection button 1118*b* is selected, the electronic device may set the specific date to the next previous date and may display the schedule items after arranging the schedule items with respect to the next date.

According to various embodiments, if an input (e.g., a pinch gesture input 1130) associated with the classification function of the schedule items is received with the schedule items displayed, as illustrated in the first state 1101, the electronic device may output a circular preview 1125, of which the diameter is a distance 1123 between the input points, about a center point 1121 of input points (e.g., a first input point 1121*a* and a second input point 1121*b*) on a preview output area 1120. For example, the electronic device may output a preview associated with the first priority class (e.g., a day class) on the display. Furthermore, the electronic device may designate a text 1127 corresponding to the class as a text (e.g., "Day") corresponding to the first priority class and may output the designated text to be adjacent to the circular preview 1125.

According to various embodiments, if the size of the input increases by the first size (e.g., if the distance 1123 between the input points increases by the first size), as illustrated in a second state 1103, after changing the circular preview 1125 into a preview associated with the second priority class (e.g., a week class), the electronic device may output the changed preview. Moreover, after changing the text 1127 corresponding to the layer into a text (e.g., "Week") corresponding to the second priority class, the electronic device may output the changed text.

According to various embodiments, the electronic device may perform an operation, which is the same as or similar to the above-mentioned operation, with respect to the low priority class of the second priority class. For example, if the size of the input increases by the second size, as illustrated in a third state 1105, after changing the circular preview 1125 into a preview associated with the third priority class (e.g., a month class), the electronic device may output the changed preview, and after changing the text 1127 corresponding to the class into a text (e.g., "Month") corresponding to the third priority class, the electronic device may output the changed text. In addition, if the size of the input increases by the third size, as illustrated in a fourth state 1107, after changing the circular preview 1125 into a preview associated with the fourth priority class (e.g., a year class), the electronic device may output the changed preview, and after changing the text 1127 corresponding to the class into a text (e.g., "Year") corresponding to the fourth priority class, the electronic device may output the changed text.

Figure 12:
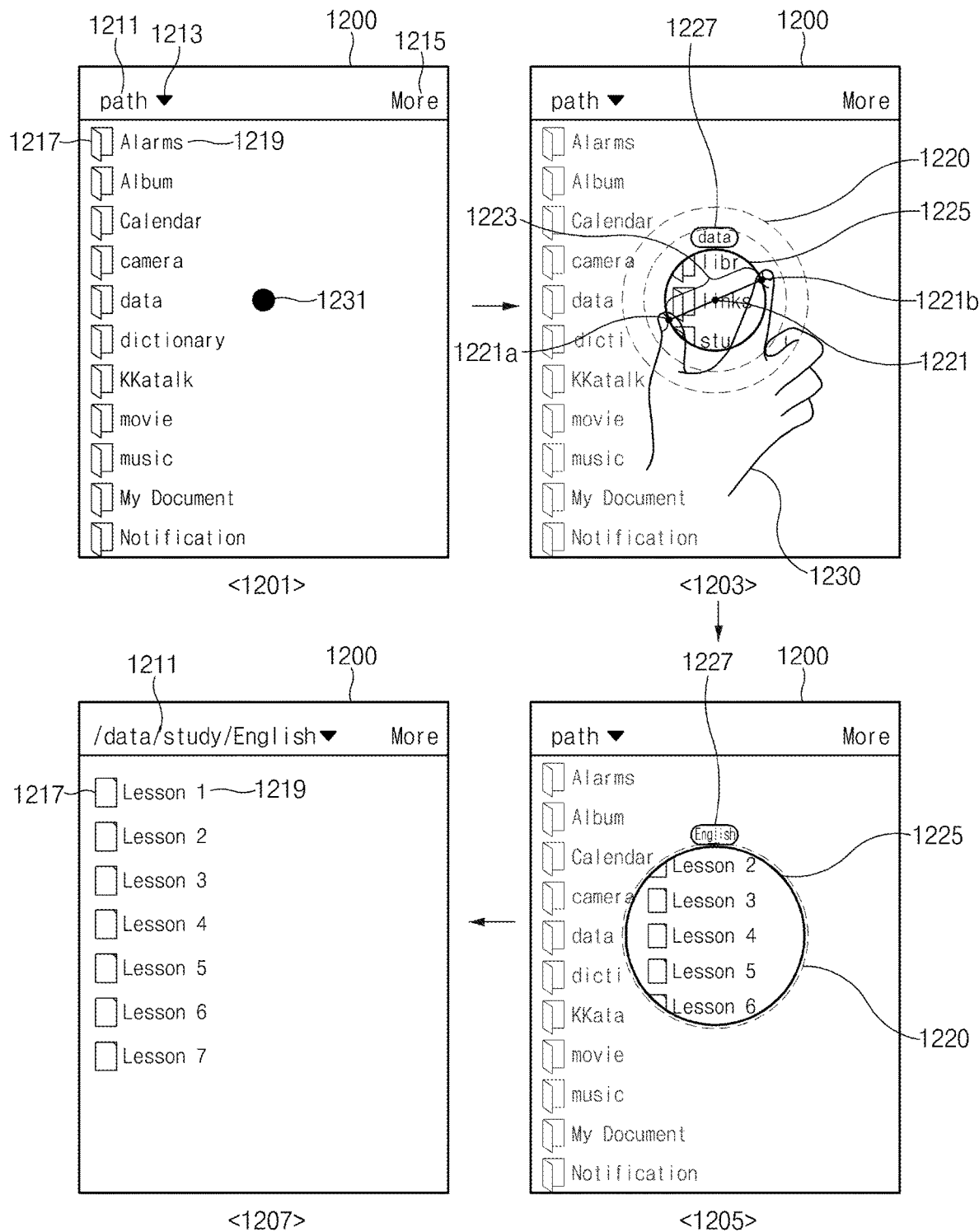
FIG. 12 illustrates a view associated with a class change in a file management application, according to various embodiments of the present disclosure.

FIG. 12 illustrates a view associated with a class change in a file management application, according to various embodiments of the present disclosure.

Referring to FIG. 12, as illustrated in the first state 1201, the electronic device (e.g., the electronic device 100 of FIG. 1) may output an execution screen 1200 of a file management application on a display (e.g., the display 170 of FIG. 1). For example, the file management application may manage various kinds of files and folders stored in a memory (e.g., the memory 150 of FIG. 1) for each storage path.

According to various embodiments, the execution screen 1200 of the file management application may classify and display items (e.g., various kinds of files and folders) stored in the memory based on a designated class. For example, after classifying an object 1217 for displaying a type of the items and an identifier 1219 of the items based on a designated class, the electronic device may display the object 1217 and the identifier 1219. The object 1217 for displaying types of the items may include a text, an image, or the like to distinguish whether the items are files or folders. The identifier 1219 of the items may include information (e.g., a file name, a folder name, or the like) that makes it possible to distinguish the items. According to various embodiments, the execution screen 1200 of the file management application may further include a class display object 1211 that is currently set, a class selection button 1213, an additional function button 1215, and the like.

The class display object 1211 that is currently set may display a text, an image, or the like corresponding to a current output class. According to an embodiment, the class display object 1211 that is currently set may display a designated text (e.g., "path") or a text (e.g., "/data/study/English") corresponding to a storage path of a currently set class.

The class selection button 1213 may select a current output class associated with classification states of the items. For example, if the class selection button 1213 is selected, the electronic device may output sub-buttons corresponding to selectable classes on the execution screen 1200 of the file management application. In this case, if a specific sub-button of the sub-buttons is selected, the electronic device may display the items after classifying the items as a class corresponding to the selected sub-button. According to an embodiment, the class selection button 1213 may include a text, image, or the like indicating the current output class.

The additional function button 1215 may perform an additional function that a file management application supports. For example, if the additional function button 1215 is selected, the electronic device may perform the additional function that the file management application supports. For example, illustrated is a case where the additional function button 1215 is set such that items that are not currently output are output in addition to the items output on the execution screen 1200 of the file management application.

According to various embodiments, if an input (e.g., a pinch gesture input 1230) associated with the classification function of the items is received at a specific location 1231, the electronic device may select an item, which is displayed on the specific location 1231 or is displayed on a location adjacent to the specific location 1231, as a target item. For example, illustrated is a state in which a specific folder (e.g., "data" folder) is selected as the target item.

According to various embodiments, the electronic device may verify a storage path of the target item. Also, the electronic device may designate the storage path of the target item to the first priority class, and in the case where the target item is a folder, the electronic device may designate the subdirectory of the target item or a file included in the folder to a low priority class. Likewise, the electronic device may identically or similarly designate the subdirectory of a low priority class or a file included in the folder to the low priority class in order. According to various embodiments, in the case where the number of subdirectories of the target item or the number of files included in the folder is plural, the electronic device may select a subdirectory or file corresponding to the specific location 1231 or corresponding to a location adjacent to the specific location 1231 and may designate the selected subdirectory or file to a low priority class. For example, FIG. 12 illustrates a state in which the electronic device designates a first directory (e.g., "/data" directory) to the first priority class, designates a second directory (e.g., "/data/study" directory) being the subdirectory of the first directory to the second priority class, and designates a third directory (e.g., "/data/study/English" directory) being the subdirectory of the second directory to the third priority class. According to various embodiments, the electronic device may designate a root directory to the first priority class.

In another example, in the case where the storage path of the target item is composed of a plurality of subdirectories (e.g., in the case where the storage path is "/data/study/English"), the electronic device may designate the path to the first priority class and may sequentially designate upper directories of the storage path to a low priority class. For example, the electronic device may designate "/data/study" directory to the second priority class and may designate "/data" directory to the third priority class.

According to various embodiments, as illustrated in a second state 1203, the electronic device may output a circular preview 1225, of which the diameter is a distance 1223 between the input points, about a center point 1221 of input points (e.g., a first input point 1221a and a second input point 1221b) on a preview output area 1220 in response to the input. For example, the electronic device may output a preview associated with the first priority class on the display. Moreover, the electronic device may designate a text 1227 corresponding to the class as a text (e.g., "data") corresponding to the first priority class and may output the designated text to be adjacent to the circular preview 1225.

According to various embodiments, if the size of the input is changed to be greater than or equal to a designated size, the electronic device may designate a movement range between classes. In addition, the electronic device may sequentially provide a preview associated with the class included in the movement range. For example, as illustrated in a third state 1205, the electronic device may output the circular preview 1225 after changing from a preview associated with the first priority class to a preview associated with the third priority class. Furthermore, after changing the text 1227 corresponding to the layer into a text (e.g., "English") corresponding to the third priority class, the electronic device may output the changed text.

According to various embodiments, if the input ends, as illustrated in a fourth state 1207, after classifying the items based on the selected class, the electronic device may display the classified items. According to various embodiments, after changing the class display object 1211, which is currently set, into a text (e.g., "/data/study/English") corresponding to the storage path of the selected class, the electronic device may display the text.

In the above-described embodiment, it is described that the classification function of items according to a class is described by using the classification function of items but is not limit thereto. The classification function of the items may include a function that classifies items by a variety of configuration information. For example, the items may be classified by a variety of configuration information such as a class, a time, a name, a ratio, or the like.

Figure 13:
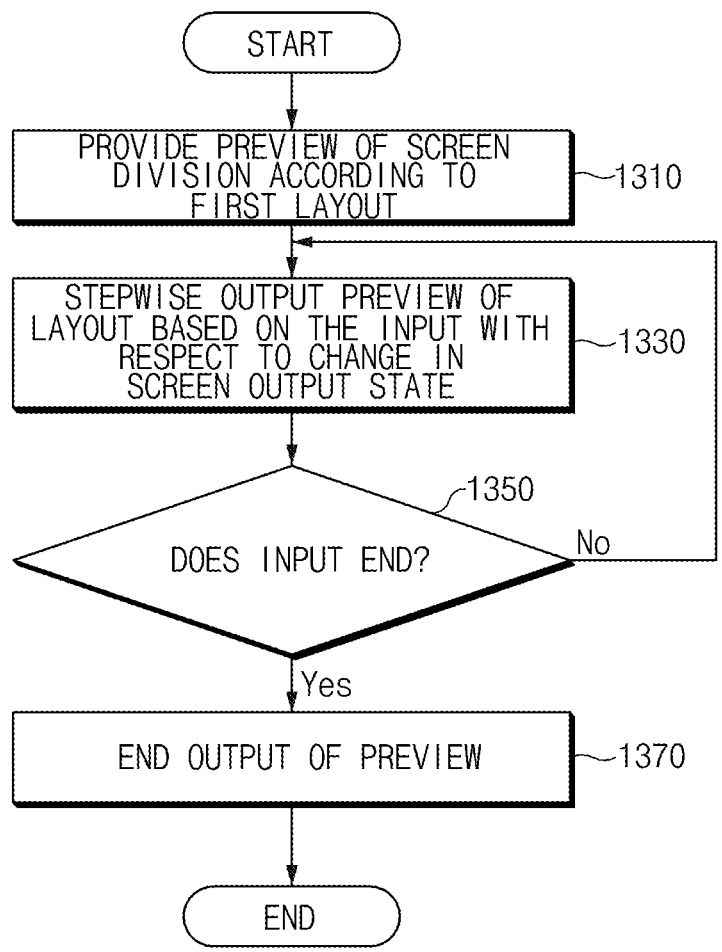
FIG. 13 illustrates a method for providing a preview of a screen division, according to various embodiments of the present disclosure.

FIG. 13 illustrates a method for providing a preview of a screen division, according to various embodiments of the present disclosure.

Referring to FIG. 13, if an input associated with the screen division is received, the electronic device (e.g., the electronic device 100 of FIG. 1) may divide a screen based on the selected layout. A description about the provision of a preview associated with a screen division state that is described below may be the same as or similar to a description about the provision of a preview associated with screen division states of the items.

In operation 1310, if an input for changing a screen output state is received and the input is associated with the screen division, the electronic device (e.g., the electronic device 100 of FIG. 1) may provide the preview of the screen division according to the first layout. The first layout may be a layout of a state in which a screen is not divided, a layout of a state in which a screen is maximally divided, or a layout before the input associated with the screen division is received. However, it is not limited thereto. The first layout may be a layout of a state in which a screen is divided into 'N' subscreens. According to an embodiment, the electronic device may output a preview associated with the first layout on a display (e.g., the display 170 of FIG. 1).

In operation 1330, the electronic device may stepwise output the preview of the layout based on the input with respect to a screen division. For example, the electronic device may designate a movement range between layouts based on a type, location, size, duration time, or the like of the input and may sequentially output the preview of the layout, which is included in the movement range, on the display. For example, if the movement range is designated to the second operation, the electronic device may sequentially output, on the display, the preview of the first layout, the preview of the second layout, and the preview of the third layout. According to various embodiments, the first to N-th layouts may be designated according to the number of divided subscreens in the screen division. For example, the number of screens in the first layout may be one, the number of sub screens in the second layout may be two, or the number of sub screens in the third layout may be three, and vice versa.

In operation 1350, the electronic device may determine whether the input ends. According to various embodiments, in the case where the input is a pinch gesture input, the electronic device may determine whether fingers corresponding to input points are divided from a touch screen. According to an embodiment, in the case where an input value received through an input interface (e.g., the input interface 110 of FIG. 1) decreases to be smaller than or equal to a designated size (in the case where there is nearly no input value), the electronic device may determine that the input ends.

According to various embodiments, in the case where the input does not end, the electronic device may return to operation 1330 and may output the preview of the layout on a display. According to various embodiments, in the case where the input ends, as illustrated in operation 1370, the electronic device may end the output of the preview. In addition, at a point in time when the input ends, the electronic device may divide the screen based on the selected layout.

Figure 14:
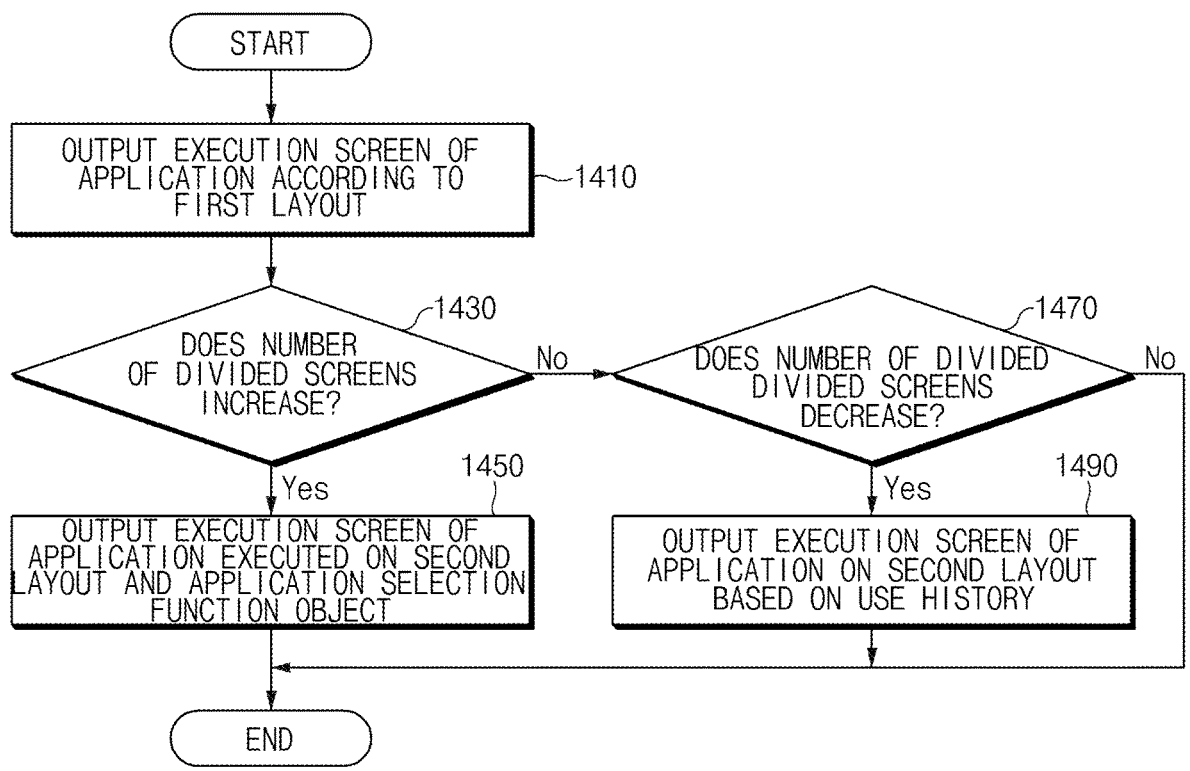
FIG. 14 illustrates a method for providing a screen based on the number of divided screens included in a layout, according to various embodiments of the present disclosure.

FIG. 14 illustrates a method for providing a screen based on the number of divided screens included in a layout, according to various embodiments of the present disclosure.

Referring to FIG. 14, in operation 1410, the electronic device (e.g., the electronic device 100 of FIG. 1) may output the execution screen of an application according to the first layout. According to an embodiment, the first layout may be a layout of a state in which the screen is not divided. Accordingly, the electronic device may output the execution screen of a currently activated application to the whole or a part of the screen.

According to various embodiments, if an input associated with the screen division is received and the second layout is selected, in operation 1430, the electronic device may determine whether the number of divided screens according to the second layout increases to be greater than the number of divided screens according to the first layout.

According to various embodiments, in the case where the number of divided screens increases, in operation 1450, the electronic device may output the execution screen of an application executed on the second layout and an application selection function object. For example, the electronic device may output, on the second layout, the execution screen of an application output on the first layout and the execution screens of applications of states in which the applications are not output on the screen in the first layout but are executed. Furthermore, in the case where the number of divided screens (e.g., the number of subscreens) of the second layout is greater than the number of applications of the executed state, the electronic device may output an application selection function object, which makes it possible to select an application, on a subscreen in which the execution screen of an application is not output. According to various embodiments, if the number of divided screens of the second layout is smaller than the number of applications of the executed state, the electronic device may output the execution screen of the application on a subscreen in the order of an application (e.g., based on use histories (or execution histories) of applications), which was recently used (or executed).

According to various embodiments, in the case where the number of divided screens does not increase, in operation 1470, the electronic device may determine whether the number of divided screens decreases. In the case where the number of divided screens decreases, in operation 1490, the electronic device may output the execution screen of the application on the second layout based on use histories (or execution histories) of applications. For example, in the case where the number of subscreens of the second layout is two and where a first application, a second application, and a third application are executed applications and are used in the order of the first application, the second application, and the third application, the electronic device may output the third and second applications on subscreens, respectively.

According to various embodiments, a screen outputting method of an electronic device may include outputting an execution screen of an application, which uses an item, to a display, obtaining a user input while the execution screen of the application is output, determining a change screen based on a variation of the user input, and outputting a preview which includes at least part of the change screen to the display while the user input is maintained. The change screen may be configured to be outputted when the user input is released.

According to various embodiments, the method may further include determining the change screen as a first screen which includes the item classified according to a class associated with the item or a second screen which is divided according to a layout, based on a type of the user input.

According to various embodiments, the method may further include determining the class based on the variation of the user input if the change screen is configured to be the first screen and configuring the preview of the change screen such that the item is classified according to the determined class.

According to various embodiments, the method may further include determining at least one of a type of the class and an order of the class based on at least one of a type of the item and user configuration information.

According to various embodiments, the method may further include determining the layout based on the variation of the user input if the change screen is configured to be the second screen and configuring the preview of the change screen is divided according to the determined layout.

According to various embodiments, the determining of the change screen may further include determining the class as a first class or determining the layout as a first layout when a magnitude of the variation of the user input is a first size, and determining the class as a second class which is lower than the first class according to the level of the class or determining the layout as a second layout which has fewer number of division than the first layout when the magnitude of the variation of the user input is a second size which is larger than the first size.

According to various embodiments, the method may further include determining a location variation from a first input location of a pinch gesture input as the variation of the user input if the user input is the pinch gesture input.

According to various embodiments, the method may further include if the user input is released, terminating an output of the preview, and outputting the change screen to the display.

According to various embodiments, the method may further include if another user input is obtained after the user input is released, determining another change screen based on a variation of the other user input, configuring another preview which includes at least part of the other change screen based on an elapsed time from a point in time when the user input is released, and outputting the other preview of the other change screen to the display while the other user input is maintained. The other change screen may be configured to be outputted when the other user input is released.

According to various embodiments, the configuring of the other preview may include configuring the other preview with respect to a top-level class or a bottom-level class of the item or a highest priority layout or a lowest priority layout of a screen of the display when the elapsed time is greater than a designated time, and configuring the other preview with respect to a current class of the item or a current layout of the screen of the display when the elapsed time is not greater than the designated time.

Figure 15:
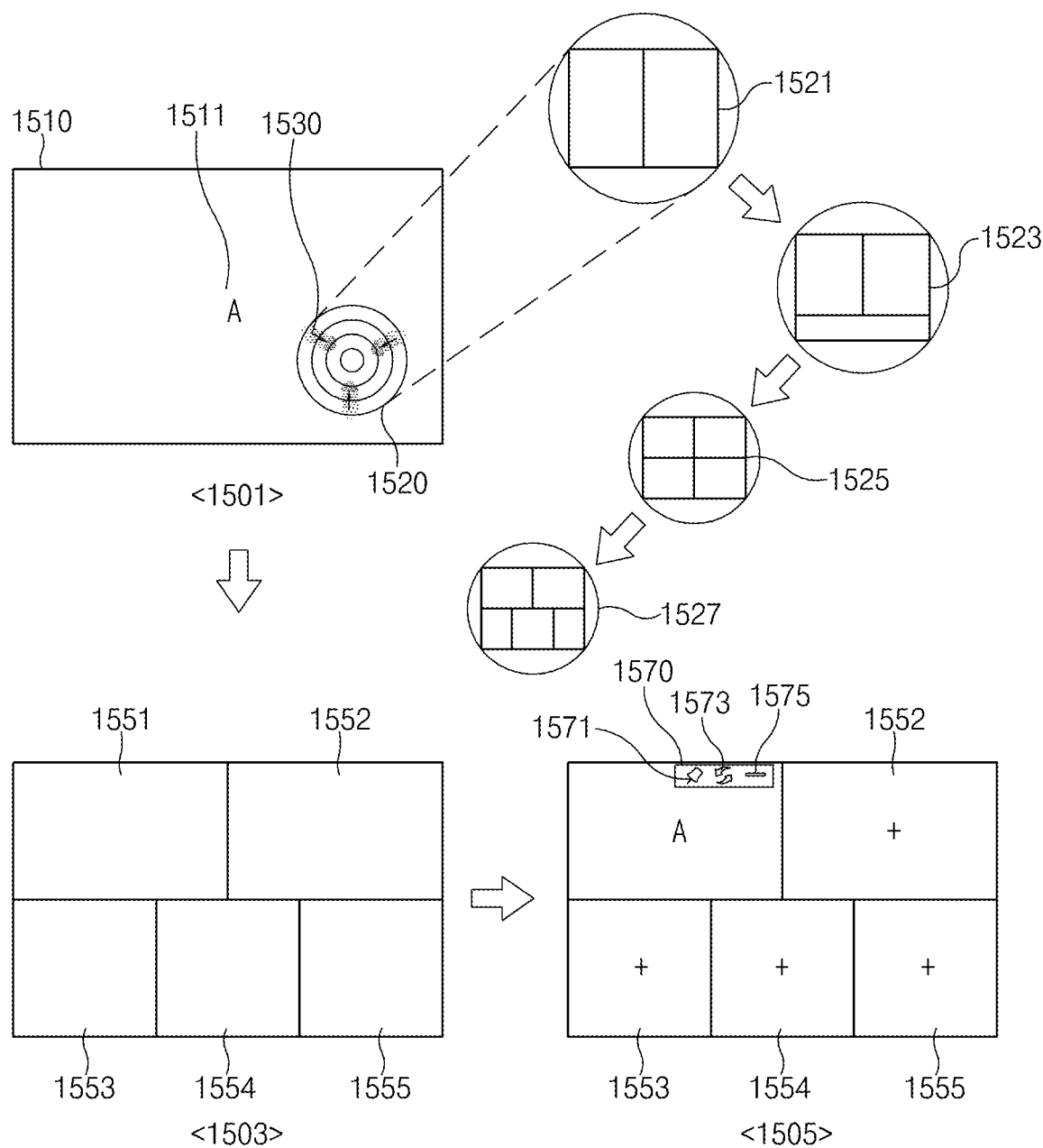
FIG. 15 is a view for describing dividing a screen in response to an input associated with a screen output state change, according to various embodiments of the present disclosure.

FIG. 15 is a view for describing dividing a screen in response to an input associated with a screen output state change, according to various embodiments of the present disclosure.

Referring to FIG. 15, as illustrated in a first state 1501, the electronic device (e.g., the electronic device 100 of FIG. 1) may output an execution screen 1510 of a first application 1511 on a display (e.g., the display 170 of FIG. 1) based on a first layout. According to various embodiments, if an input 1530 (e.g., a three-finger pinch gesture input) associated with the screen division is received, the electronic device may output a preview 1520 of a layout associated with the screen division state to a location, in which the input 1530 associated with the screen division is received, or a location adjacent to the location.

According to various embodiments, the preview 1520 of a layout associated with the screen division state may be provided to be the same as or similar to a preview associated with the classification states of the items, and the detailed description thereof is not repeated here. For example, illustrated is a state in which the movement range between layouts associated with a screen division state is designated according to a type, location, size, duration time, or the like of the input and the electronic device sequentially provides a preview associated with the layer included in the movement range. For example, the electronic device may sequentially provide a preview 1521 of the second layout, a preview 1523 of the third layout, a preview 1525 of the fourth layout, and a preview 1527 of the fifth layout.

According to various embodiments, if the input ends, as illustrated in a second state 1503, the electronic device may divide the screen based on the selected layout. For example, illustrated is a state in which the fifth layout is selected and the electronic device divides a screen into a first subscreen 1551, a second subscreen 1552, a third subscreen 1553, a fourth subscreen 1554, and a fifth subscreen 1555.

According to various embodiments, if the screen is divided according to the selected layout, as illustrated in a third state 1505, the electronic device may output the execution screen of an application (e.g., the first application 1511) that is executed in the divided subscreen. According to an embodiment, in the case where the number of applications that are executed is plural, the electronic device may sequentially output the execution screen of the application to the first subscreen 1551, the second subscreen 1552, the third subscreen 1553, the fourth subscreen 1554, and the fifth subscreen 1555 in the order of an application, which was recently used, based on the execution history of an application. In addition, in the case where the execution screen of an application is not output on the divided subscreens, the electronic device may output an application selection function object (e.g., a button object of "+" form), which makes it possible to select an application, on the subscreen. FIG. 15 illustrates that the execution screen of the first application 1511 is output on the first subscreen 1551 and the application selection function object is output on the second subscreen 1552, the third subscreen 1553, the fourth subscreen 1554, and the fifth subscreen 1555.

According to various embodiments, if the application selection function object is selected, the electronic device may provide the list of an application installed in the electronic device. According to an embodiment, the electronic device may provide the list of the application in the form of a popup. Also, if a specific application is selected from the list of the application, the electronic device may output the execution screen of the selected application on the subscreen. According to various embodiments, an application (e.g., the first application 1511) that is currently executed may be included in the list of the application and the electronic device may output the execution screen of the same application on different subscreens. According to various embodiments, in the case of the same application, the electronic device may restrict the maximum execution number (e.g., two) to output the execution screen of the same application on a subscreen.

According to various embodiments, the electronic device may output an additional function selection menu 1570 on a specific area (e.g., a top right area) of an output subscreen on which the execution screen of an application is output. The additional function selection menu 1570 may include a pin function button 1571, a switch function button 1573, and a deletion function button 1575. The pin function button 1571 may be configured to fix an application output on the subscreen and to output the application. For example, if the pin function button 1571 is selected, the execution screen continuously may be output on the subscreen even though a layout of an application that occupies the subscreen is changed and the number of subscreens decreases. According to an embodiment, the number (e.g., two) of selectable applications may be restricted by using the pin function button 1571. Furthermore, even though the pin function button 1571 is selected and the application is set to be fixed, the electronic device may cancel the selection of the application if the pin function button 1571 is again selected.

The switch function button 1573 may switch an application output on the subscreen. According to an embodiment, if the switch function button 1573 is selected, the electronic device may provide the list of an application installed in the electronic device. In this case, the electronic device may exclude an application, which is output on the subscreen, from the list of an application. Moreover, if a specific application is selected from the list of the application, the electronic device may output the execution screen of the selected application on the subscreen.

The deletion function button 1575 may end the execution screen of an application output on the subscreen. According to an embodiment, if the deletion function button 1575 is selected, the electronic device may end the execution of an application output on the subscreen and may delete the execution screen from the subscreen. According to an embodiment, the electronic device may delete only the execution screen from the subscreen instead of ending the execution of an application output on the sub screen.

Figure 16:
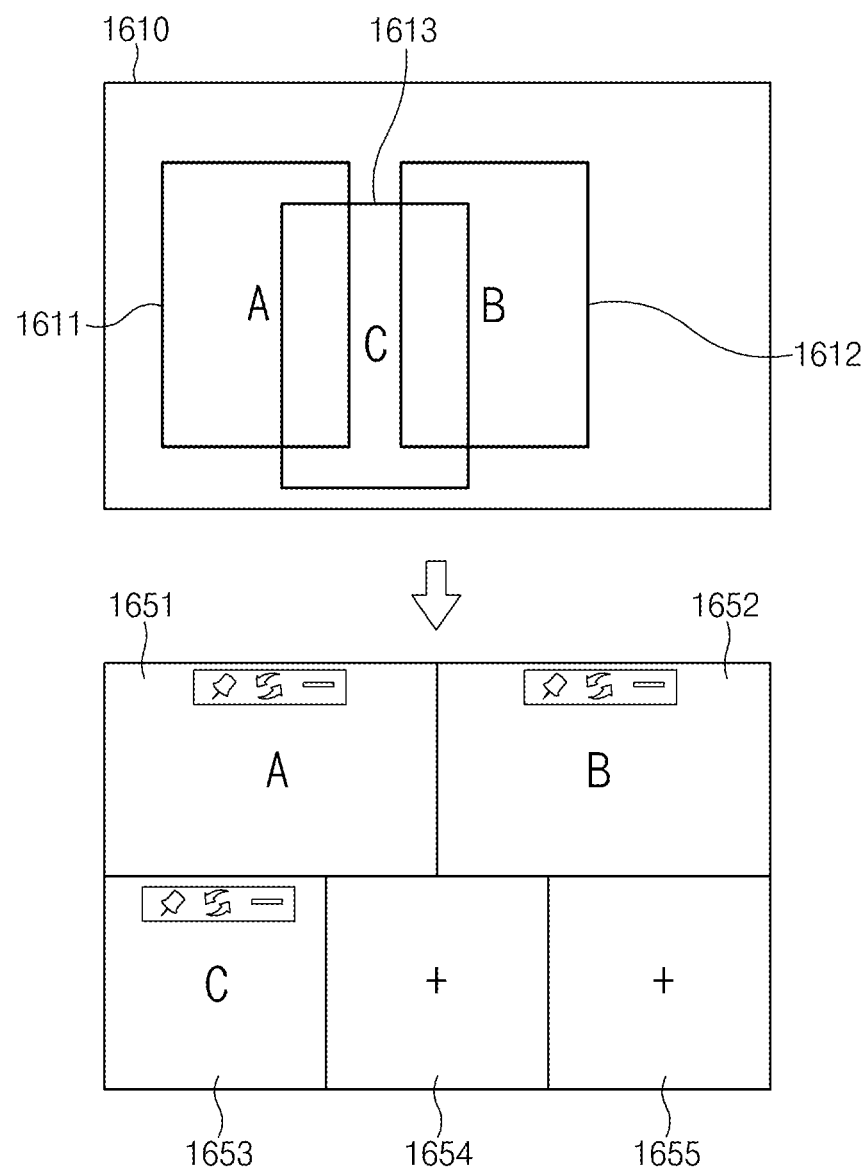
FIG. 16 illustrates a diagram for describing a screen configuration when a number of divided screens is smaller than a number of executed applications, according to various embodiments of the present disclosure.

FIG. 16 illustrates a diagram for describing a screen configuration when a number of divided screens is smaller than a number of executed applications, according to various embodiments of the present disclosure.

Referring to FIG. 16, in the case where the number of applications output on the display 1610 (or executed but not output on a screen) is smaller than the number of divided screens according to the selected layout in response to an input associated with a screen division, the electronic device (e.g., the electronic device 100 of FIG. 1) may output the execution screen of the output (or executed) application and an application selection function object on each subscreen. For example, in the case where the divided subscreens according to the selected layout are a first subscreen 1651, a second subscreen 1652, a third subscreen 1653, a fourth subscreen 1654, and a fifth subscreen 1655 while a first application 1611, a second application 1612, and a third application 1613 are executed, the electronic device may output the execution screen of the first application 1611 on the first subscreen 1651, may output the execution screen of the second application 1612 on the second subscreen 1652, and may output the execution screen of the third application 1613 on the third subscreen 1653. However, a location on which the execution screen of an application is output is not limited thereto. For example, the execution screen of the first application 1611 may be output on one of the second subscreen 1652, the third subscreen 1653, the fourth subscreen 1654, or the fifth subscreen 1655.

According to various embodiments, the application selection function object may be output on a subscreen on which the execution screen of an application is not output. For example, FIG. 16 illustrates a state in which the application selection function object is output on the fourth subscreen 1654 and the fifth subscreen 1655.

Figure 17:
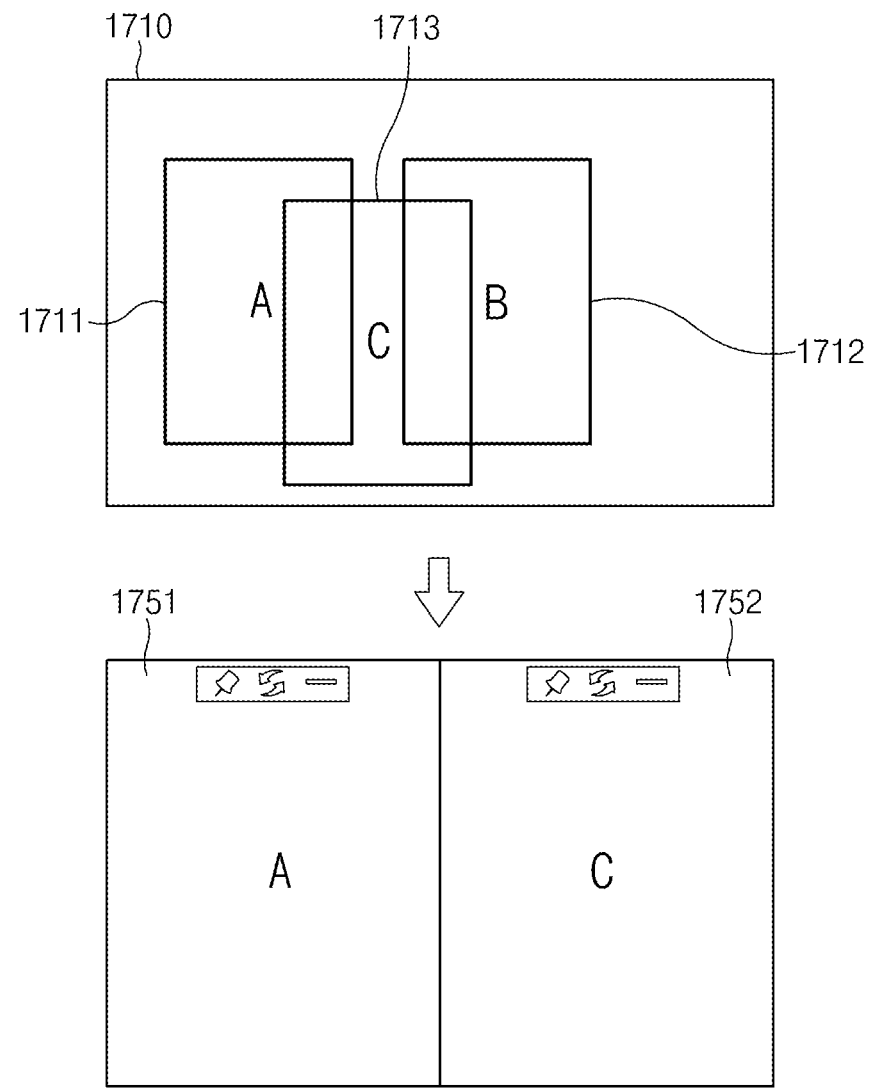
FIG. 17 illustrates a diagram for describing a screen configuration when a number of divided screens is greater than a number of executed applications, according to various embodiments of the present disclosure.

FIG. 17 illustrates a diagram for describing a screen configuration when a number of divided screens is greater than a number of executed applications, according to various embodiments of the present disclosure.

Referring to FIG. 17, in the case where the number of applications output on the display 1710 (or executed but not output on a screen) is greater than the number of divided screens according to the selected layout in response to an input associated with a screen division, the electronic device (e.g., the electronic device 100 of FIG. 1) may output the execution screen of the output (or executed) application on a subscreen based on execution (or use) histories of output or executed applications in the order of an application, which was recently executed (or used). For example, in the case where the divided subscreens according to the selected layout are a first subscreen 1751 and a second subscreen 1752 while a first application 1711, a second application 1712, and a third application 1713 are sequentially executed, the electronic device may output the execution screen of the third application 1713 on the first subscreen 1751 and may output the execution screen of the second application 1712 on the second subscreen 1752. Alternatively, in the case where the first application 1711 was recently used after the first application 1711, the second application 1712, and the third application 1713 have been sequentially executed, the electronic device may output the execution screen of the first application 1711 on the first subscreen 1751 and may output the execution screen of the third application 1713 on the second subscreen 1752.

Figure 18:
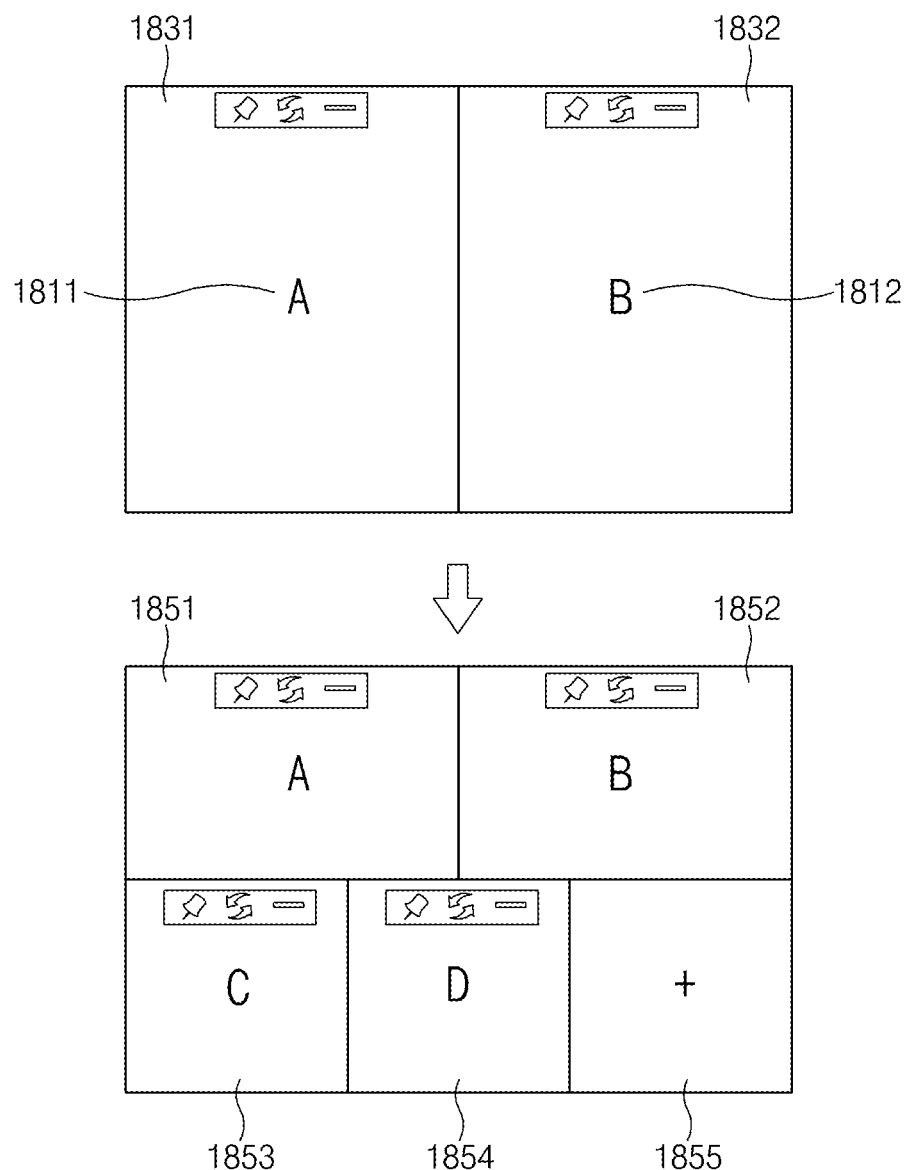
FIG. 18 illustrates a diagram for describing a screen configuration when a number of divided screens increases, according to various embodiments of the present disclosure.

FIG. 18 illustrates a diagram for describing a screen configuration when a number of divided screens increases, according to various embodiments of the present disclosure.

Referring to FIG. 18, if the number of divided screens according to a layout that is changed according to the change in a screen division state increases, the electronic device (e.g., the electronic device 100 of FIG. 1) may output the execution screen of an application output on a layout before the change and the execution screen of the application that is executed but is not output on the layout. For example, on the basis of the first layout before the change in a screen division state, the electronic device may output the execution screen of a first application 1811 on a first subscreen 1831 and may output the execution screen of a second application 1812 on a second subscreen 1832. Also, the electronic device may be in a state where the third application and the fourth application are executed as well as the first application 1811 and the second application 1812. In this state, if the first layout is changed into the second layout according to the change in a screen division state and the screen is divided into a third subscreen 1851, a fourth subscreen 1852, a fifth subscreen 1853, a sixth subscreen 1854, and a seventh subscreen 1855, the electronic device may output the execution screen of the first application 1811, which was output on the first subscreen 1831, on the third subscreen 1851 and may output the execution screen of the second application 1812, which was output on the second subscreen 1832, on the fourth subscreen 1852. Furthermore, the electronic device may output the execution screen of the third application on the fifth subscreen 1853 and may output the execution screen of the fourth application on the sixth subscreen 1854.

According to various embodiments, an output location of the execution screen of an application is not limited thereto. In addition, in the case where there is a subscreen on which the execution screen of an application is not output, an application selection function object may be output on the subscreen. According to various embodiments, in the case where the number of executed applications is greater than the number of divided subscreens, the electronic device may output the execution screen of an application (e.g., the first application 1811 and the second application 1812), which was output on an existing layout (e.g., the first layout) and may sequentially output the execution screens of the remaining executed applications on the remaining subscreens based on the execution (or use) history of an executed application.

Figure 19:
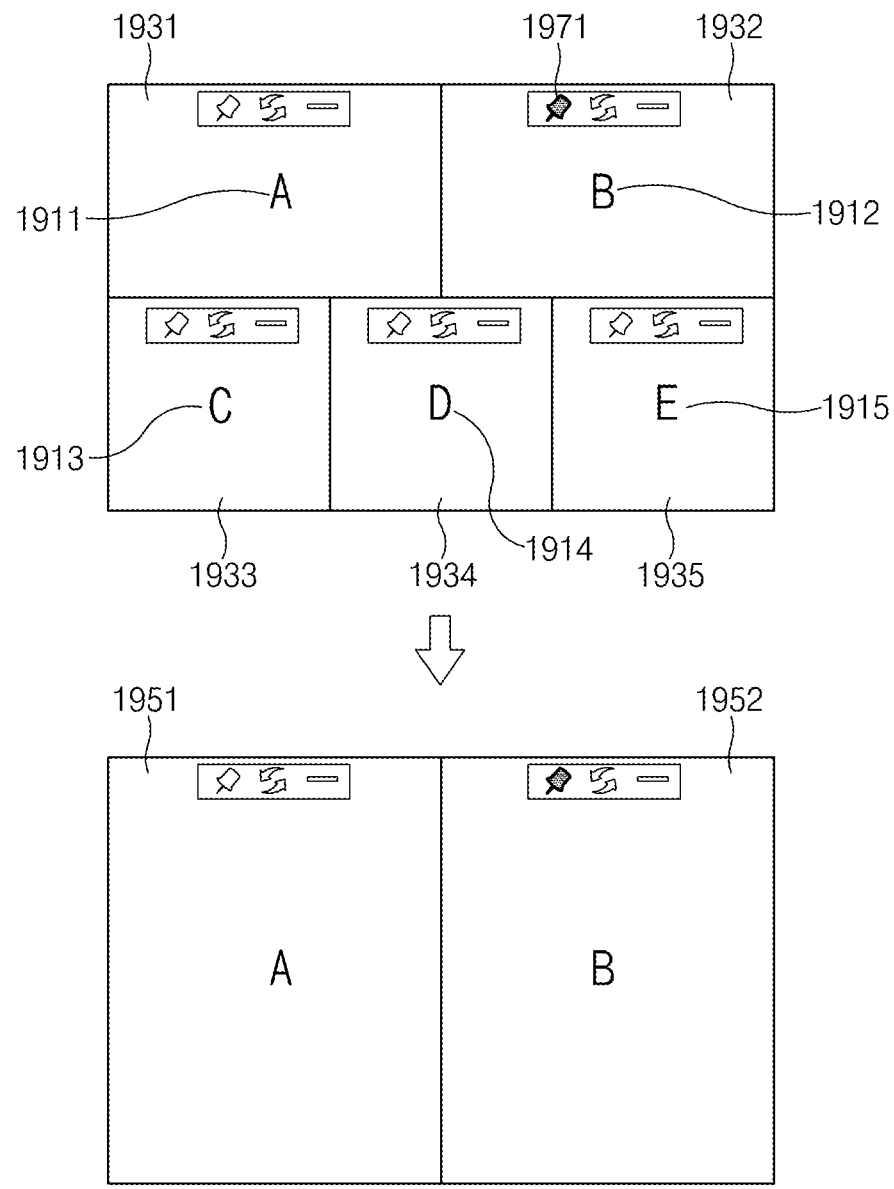
FIG. 19 illustrates a diagram for describing a screen configuration when a number of divided screens decreases, according to various embodiments of the present disclosure.

FIG. 19 illustrates a diagram for describing a screen configuration when a number of divided screens decreases, according to various embodiments of the present disclosure.

Referring to FIG. 19, if the number of divided screens decreases, the electronic device (e.g., the electronic device 100 of FIG. 1) may sequentially output the execution screen of an application based on an execution (or use) history of an application output on a layout before the change. For example, on the basis of the first layout before the change in a screen division state, the electronic device may output the execution screen of a first application 1911 on a first subscreen 1931, may output the execution screen of a second application 1912 on a second subscreen 1932, may output the execution screen of a third application 1913 on a third subscreen 1933, may output the execution screen of a fourth application 1914 on a fourth subscreen 1934, and may output the execution screen of a fifth application 1915 on a fifth subscreen 1935. In this state, if the first layout is changed into the second layout according to the change in a screen division state and the screen is divided into a sixth subscreen 1951 and a seventh subscreen 1952, the electronic device may output the execution screen of the first application 1911, which was recently executed (or used) according to execution (or use) histories of applications, on the sixth subscreen 1951 and may output the execution screen of the second application 1912, which was previously executed, on the seventh subscreen 1952.

According to various embodiments, in the case where there is an application, in which a pin function button 1971 is selected and which is fixed on the subscreen, from among applications output on an existing layout (e.g., the first layout), the electronic device may output the execution screen of the application on the subscreen of a layout (e.g., the second layout) changed so as to correspond to the order of the subscreens. For example, FIG. 19 illustrates a state in which the pin function button 1971 included in the second subscreen 1932 is selected and the second application 1912 is fixed on the second subscreen 1932. Accordingly, even though the first layout is changed into the second layout, the electronic device may output the execution screen of the second application 1912 on the subscreen (e.g., the seventh subscreen 1952) of the second layout so as to correspond to the order (e.g., the second) of the second subscreen 1932 on the first layout.

Figure 20:
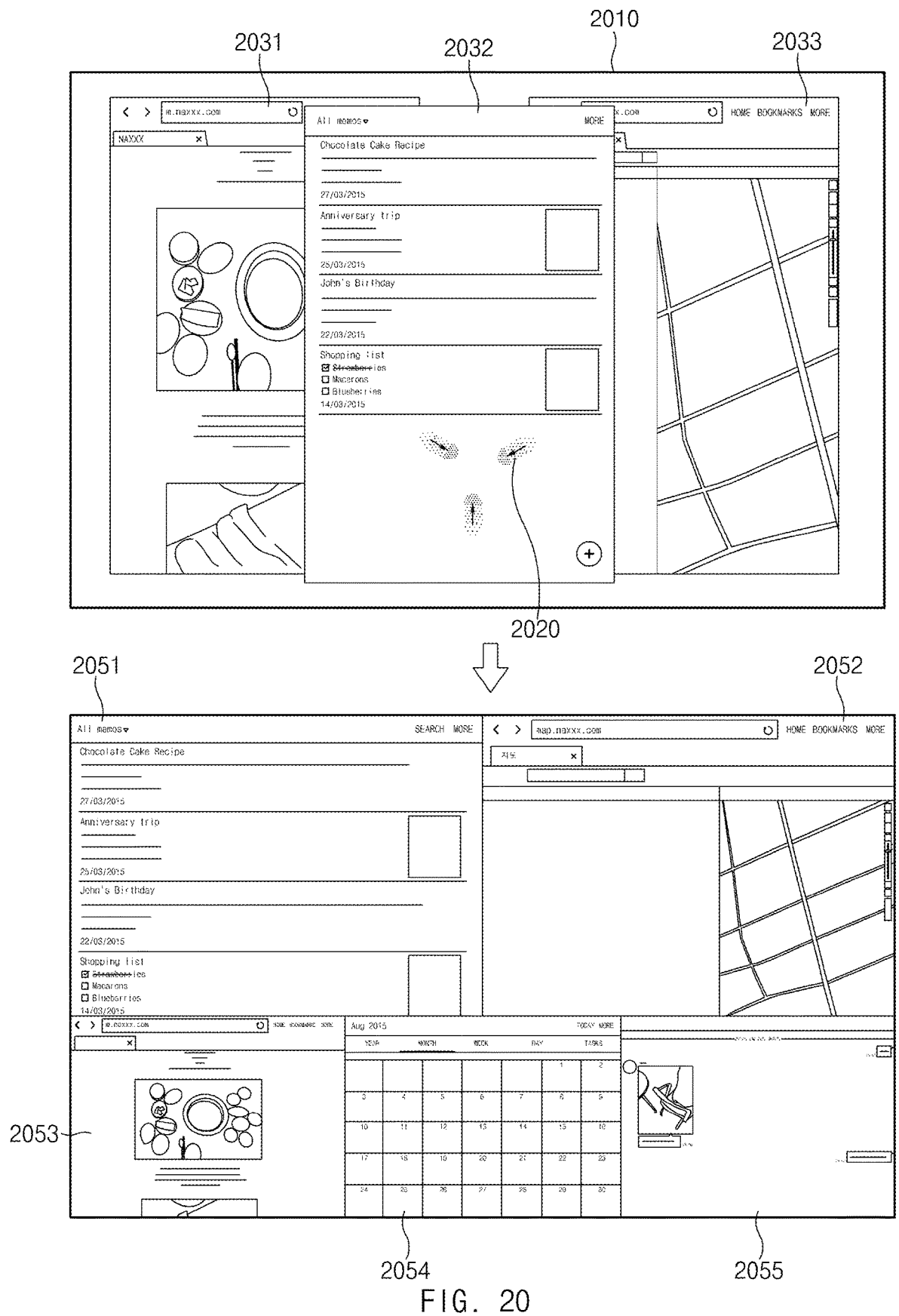
FIG. 20 is a view for describing an embodiment in which a screen is divided in response to an input associated with a screen output state change, according to various embodiments of the present disclosure.

FIG. 20 is a view for describing an embodiment in which a screen is divided in response to an input associated with a screen output state change, according to various embodiments of the present disclosure.

Referring to FIG. 20, the electronic device (e.g., the electronic device 100 of FIG. 1) may output the execution screen of a plurality of applications on a display 2010. For example, the electronic device outputs a first application 2031 (e.g., a web search application), a second application 2032 (e.g., a memo application), and a third application 2033 (e.g., a map search application) on the display 2010. According to various embodiments, in the electronic device, each of a plurality of applications may be output on one layer. For example, the drawing illustrates a state in which the second application 2032 is output on a top-level layer and the first application 2031 and the third application 2033 are output on a lower layer. In the case where each of the plurality of applications is output on one layer, it is inconvenient to use the electronic device because screens respectively corresponding to layers are overlapped with each other.

According to various embodiments, the electronic device may divide a screen based on a layout selected in response to an input 2020 (e.g., a three-finger pinch gesture input) associated with the screen division function. As illustrated in FIG. 20, the electronic device may divide a screen into a plurality of subscreens and may output the execution screen of an application to each of the subscreens. For example, FIG. 20 illustrates a state in which the electronic device divides a screen into a first subscreen 2051, a second subscreen 2052, a third sub screen 2053, a fourth subscreen 2054, and a fifth subscreen 2055 and outputs the execution screen of the memo application, the execution screen of the map search application, the execution screen of the web search application, the execution screen of a schedule management application, and the execution screen of a message application. As such, if a screen is divided into a plurality of subscreens, each of the subscreens outputs the execution screen of an application in a designated area, thereby preventing a part of a screen from being overlapped with each other.

According to various embodiments, the electronic device may restrict the number of divided subscreens to the number of applications that are currently executed. In addition, the electronic device may adjust the size of the divided subscreens in the manner that a user wants. For example, the electronic device may change at least one of the width or height of the divided subscreen, and the size of another subscreen may be also changed as the size of a specific subscreen is changed. For example, in FIG. 20, if the width of the first subscreen 2051 increases, the width of the second subscreen 2052 may decrease by a corresponding length.

According to various embodiments of the present disclosure, if an input for changing a screen output state is received, the preview of a function execution screen may be provided, thereby intuitively verifying a function execution screen to be moved.

Furthermore, according to various embodiments of the present disclosure, a class corresponding to at least one movement range associated with the classification states of items may be changed based on a designated input, thereby easily performing a movement between classes.

Also, according to various embodiments of the present disclosure, a layout corresponding to at least one movement range associated with the division state of a screen may be changed based on a designated input, thereby easily dividing a screen into a desired layout.

Figure 21:
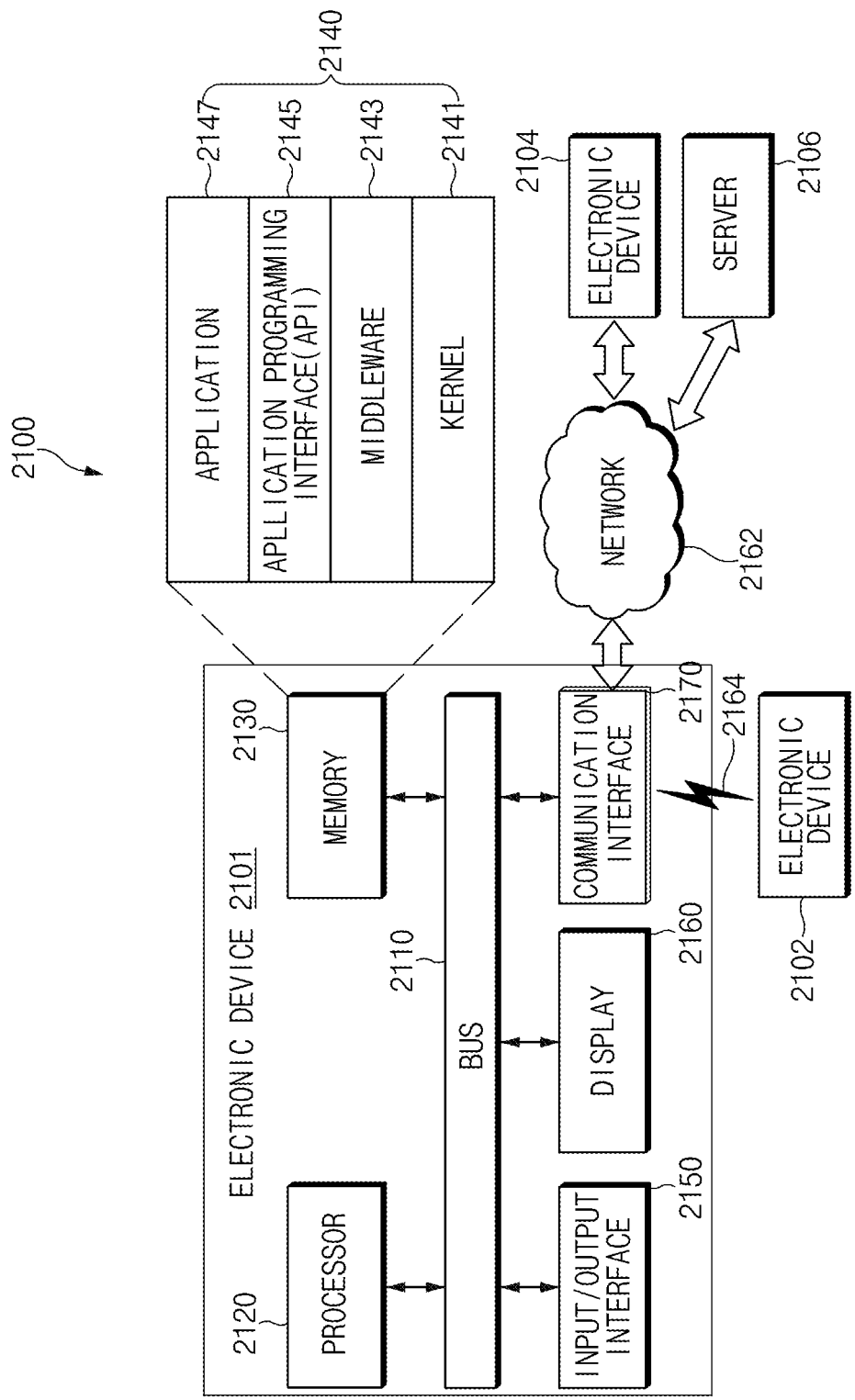
FIG. 21 illustrates an electronic device in a network environment according to an embodiment of the present disclosure.

FIG. 21 illustrates an electronic device in a network environment according to an embodiment of the present disclosure.

Referring to FIG. 21, an electronic device 2101 in a network environment 2100 may include a bus 2110, a processor 2120, a memory 2130, an input/output interface 2150, a display 2160, and a communication interface 2170. In various embodiments of the present disclosure, at least one of the foregoing elements may be omitted or another element may be added to the electronic device 2101.

The bus 2110 may include a circuit for connecting the above-mentioned elements 2110 to 2170 to each other and transferring communications (e.g., control messages and/or data) among the above-mentioned elements.

The processor 2120 may include at least one of a CPU, an AP, or a CP. The processor 2120 may perform data processing or an operation related to communication and/or control of at least one of the other elements of the electronic device 2101.

The memory 2130 may include a volatile memory and/or a nonvolatile memory. The memory 2130 may store instructions or data related to at least one of the other elements of the electronic device 2101. According to an embodiment of the present disclosure, the memory 2130 may store software and/or a program 2140. The program 2140 may include, for example, a kernel 2141, a middleware 2143, an application programming interface (API) 2145, and/or an application program (or an application) 2147. At least a portion of the kernel 2141, the middleware 2143, or the API 2145 may be referred to as an operating system (OS).

The kernel 2141 may control or manage system resources (e.g., the bus 2110, the processor 2120, the memory 2130, or the like) used to perform operations or functions of other programs (e.g., the middleware 2143, the API 2145, or the application 2147). Furthermore, the kernel 2141 may provide an interface for allowing the middleware 2143, the API 2145, or the application 2147 to access individual elements of the electronic device 2101 in order to control or manage the system resources.

The middleware 2143 may serve as an intermediary so that the API 2145 or the application 2147 communicates and exchanges data with the kernel 2141.

Furthermore, the middleware 2143 may handle one or more task requests received from the application 2147 according to a priority order. For example, the middleware 2143 may assign at least one application 2147 a priority for using the system resources (e.g., the bus 2110, the processor 2120, the memory 2130, or the like) of the electronic device 2101. For example, the middleware 2143 may handle the one or more task requests according to the priority assigned to the at least one application, thereby performing scheduling or load balancing with respect to the one or more task requests.

The API 2145, which is an interface for allowing the application 2147 to control a function provided by the kernel 2141 or the middleware 2143, may include, for example, at least one interface or function (e.g., instructions) for file control, window control, image processing, character control, or the like.

The input/output interface 2150 may serve to transfer an instruction or data input from a user or another external device to (an)other element(s) of the electronic device 2101. Furthermore, the input/output interface 2150 may output instructions or data received from (an)other element(s) of the electronic device 2101 to the user or another external device.

The display 2160 may include, for example, a liquid crystal display (LCD), a light-emitting diode (LED) display, an organic LED (OLED) display, a microelectromechanical systems (MEMS) display, or an electronic paper display. The display 2160 may present various content (e.g., a text, an image, a video, an icon, a symbol, or the like) to the user. The display 2160 may include a touch screen, and may receive a touch, gesture, proximity or hovering input from an electronic pen or a part of a body of the user.

The communication interface 2170 may set communications between the electronic device 2101 and an external device (e.g., a first electronic device 2102, a second external electronic device 2104, or a server 2106). For example, the communication interface 2170 may be connected to a network 2162 via wireless communications or wired communications so as to communicate with the external device (e.g., the second external electronic device 2104 or the server 2106).

The wireless communications may employ at least one of cellular communication protocols such as long-term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM). The wireless communications may include, for example, a short-range communications 2164. The short-range communications may include at least one of Wi-Fi, Bluetooth (BT), near field communication (NFC), magnetic stripe transmission (MST), or GNSS.

The MST may generate pulses according to transmission data and the pulses may generate electromagnetic signals. The electronic device 2101 may transmit the electromagnetic signals to a reader device such as a POS device. The POS device may detect the magnetic signals by using a MST reader and restore data by converting the detected electromagnetic signals into electrical signals.

The GNSS may include, for example, at least one of global positioning system (GPS), global navigation satellite system (GLONASS), BeiDou navigation satellite system (BeiDou), or Galileo, the European global satellite-based navigation system according to a use area or a bandwidth. Hereinafter, the term "GPS" and the term "GNSS" may be interchangeably used. The wired communications may include at least one of universal serial bus (USB), high definition multimedia interface (HDMI), recommended standard 832 (RS-232), plain old telephone service (POTS), or the like. The network 2162 may include at least one of telecommunications networks, for example, a computer network (e.g., local area network (LAN) or wide area network (WAN)), the Internet, or a telephone network.

The types of the first electronic device 2102 and the second electronic device 2104 may be the same as or different from the type of the electronic device 2101. According to an embodiment of the present disclosure, the server 2106 may include a group of one or more servers. A portion or all of operations performed in the electronic device 2101 may be performed in one or more other electronic devices (e.g., the first electronic device 2102, the second electronic device 2104, or the server 2106). When the electronic device 2101 should perform a certain function or service automatically or in response to a request, the electronic device 2101 may request at least a portion of functions related to the function or service from another device (e.g., the first electronic device 2102, the second electronic device 2104, or the server 2106) instead of or in addition to performing the function or service for itself. The other electronic device (e.g., the first electronic device 2102, the second electronic device 2104, or the server 2106) may perform the requested function or additional function, and may transfer a result of the performance to the electronic device 2101. The electronic device 2101 may use a received result itself or additionally process the received result to provide the requested function or service. To this end, for example, a cloud computing technology, a distributed computing technology, or a client-server computing technology may be used.

Figure 22:
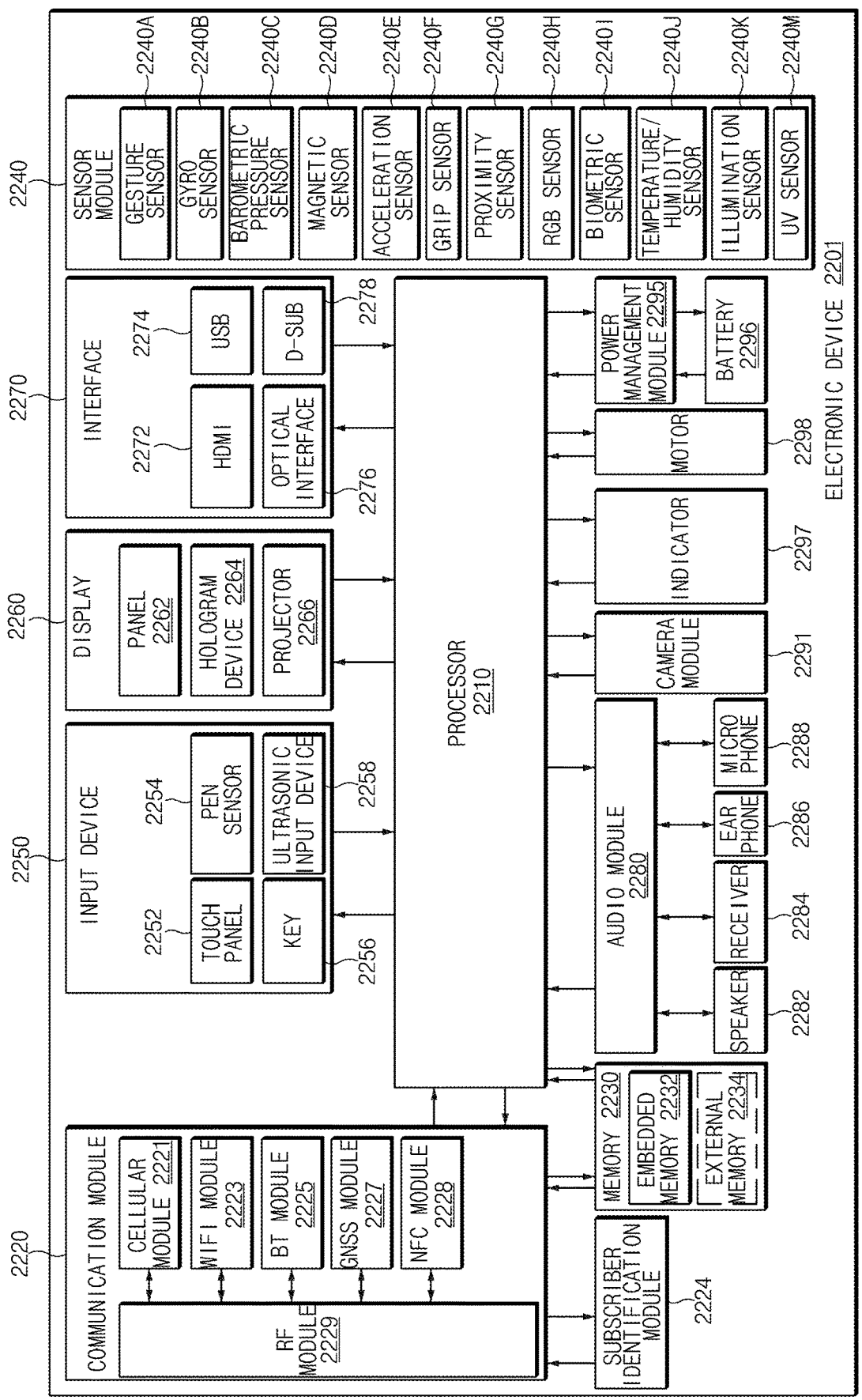
FIG. 22 is a block diagram illustrating an electronic device according to an embodiment of the present disclosure.

FIG. 22 is a block diagram illustrating an electronic device according to an embodiment of the present disclosure.

Referring to FIG. 22, an electronic device 2201 may include, for example, a part or the entirety of the electronic device 2101 illustrated in FIG. 21. The electronic device 2201 may include at least one processor (e.g., AP) 2210, a communication module 2220, a subscriber identification module (SIM) 2224, a memory 2230, a sensor module 2240, an input device 2250, a display 2260, an interface 2270, an audio module 2280, a camera module 2291, a power management module 2295, a battery 2296, an indicator 2297, and a motor 2298.

The processor 2210 may run an OS or an application program so as to control a plurality of hardware or software elements connected to the processor 2210, and may process various data and perform operations. The processor 2210 may be implemented with, for example, a system on chip (SoC). According to an embodiment of the present disclosure, the processor 2210 may further include a graphics processing unit (GPU) and/or an image signal processor (ISP). The processor 2210 may include at least a portion (e.g., a cellular module 2221) of the elements illustrated in FIG. 22. The processor 2210 may load, on a volatile memory, an instruction or data received from at least one of other elements (e.g., a nonvolatile memory) to process the instruction or data, and may store various data in a nonvolatile memory.

The communication module 2220 may have a configuration that is the same as or similar to that of the communication interface 2170 of FIG. 21. The communication module 2220 may include, for example, the cellular module 2221, a Wi-Fi module 2223, a BT module 2225, a GNSS module 2227 (e.g., a GPS module, a GLONASS module, a BeiDou module, or a Galileo module), a NFC module 2228, and a radio frequency (RF) module 2229.

The cellular module 2221 may provide, for example, a voice call service, a video call service, a text message service, or an Internet service through a communication network. The cellular module 2221 may identify and authenticate the electronic device 2201 in the communication network using the SIM 2224 (e.g., a SIM card). The cellular module 2221 may perform at least a part of functions that may be provided by the processor 2210. The cellular module 2221 may include a CP.

Each of the Wi-Fi module 2223, the BT module 2225, the GNSS module 2227 and the NFC module 2228 may include, for example, a processor for processing data transmitted/received through the modules. According to some various embodiments of the present disclosure, at least a part (e.g., two or more) of the cellular module 2221, the Wi-Fi module 2223, the BT module 2225, the GNSS module 2227, and the NFC module 2228 may be included in a single integrated chip (IC) or IC package.

The RF module 2229 may transmit/receive, for example, communication signals (e.g., RF signals). The RF module 2229 may include, for example, a transceiver, a power amp module (PAM), a frequency filter, a low noise amplifier (LNA), an antenna, or the like. According to another embodiment of the present disclosure, at least one of the cellular module 2221, the Wi-Fi module 2223, the BT module 2225, the GNSS module 2227, or the NFC module 2228 may transmit/receive RF signals through a separate RF module.

The SIM 2224 may include, for example, an embedded SIM and/or a card containing the subscriber identity module, and may include unique identification information (e.g., an integrated circuit card identifier (ICCID)) or subscriber information (e.g., international mobile subscriber identity (IMSI)).

The memory 2230 (e.g., the memory 2130) may include, for example, an internal memory 2232 or an external memory 2234. The internal memory 2232 may include at least one of a volatile memory (e.g., a dynamic random access memory (DRAM), a static RAM (SRAM), a synchronous dynamic RAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, or a solid state drive (SSD).

The external memory 2234 may include a flash drive such as a compact flash (CF), a secure digital (SD), a micro-SD, a mini-SD, an extreme digital (xD), a multi-media card (MMC), a memory stick, or the like. The external memory 2234 may be operatively and/or physically connected to the electronic device 2201 through various interfaces.

The sensor module 2240 may, for example, measure physical quantity or detect an operation state of the electronic device 2201 so as to convert measured or detected information into an electrical signal. The sensor module 2240 may include, for example, at least one of a gesture sensor 2240A, a gyro sensor 2240B, a barometric pressure sensor 2240C, a magnetic sensor 2240D, an acceleration sensor 2240E, a grip sensor 2240F, a proximity sensor 2240G, a color sensor 2240H (e.g., a red/green/blue (RGB) sensor), a biometric sensor 2240I, a temperature/humidity sensor 2240J, an illumination sensor 2240K, or an ultraviolet (UV) sensor 2240M. Additionally or alternatively, the sensor module 2240 may include, for example, an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 2240 may further include a control circuit for controlling at least one sensor included therein. In some various embodiments of the present disclosure, the electronic device 2201 may further include a processor configured to control the sensor module 2240 as a part of the processor 2210 or separately, so that the sensor module 2240 is controlled while the processor 2210 is in a sleep state.

The input device 2250 may include, for example, a touch panel 2252, a (digital) pen sensor 2254, a key 2256, or an ultrasonic input device 2258. The touch panel 2252 may employ at least one of capacitive, resistive, infrared, and UV sensing methods. The touch panel 2252 may further include a control circuit. The touch panel 2252 may further include a tactile layer so as to provide a haptic feedback to a user.

The (digital) pen sensor 2254 may include, for example, a sheet for recognition which is a part of a touch panel or is separate. The key 2256 may include, for example, a physical button, an optical button, or a keypad. The ultrasonic input device 2258 may sense ultrasonic waves generated by an input tool through a microphone 2288 so as to identify data corresponding to the ultrasonic waves sensed.

The display 2260 (e.g., the display 2160) may include a panel 2262, a hologram device 2264, or a projector 2266. The panel 2262 may have a configuration that is the same as or similar to that of the display 2160 of FIG. 21. The panel 2262 may be, for example, flexible, transparent, or wearable. The panel 2262 and the touch panel 2252 may be integrated into a single module. The hologram device 2264 may display a stereoscopic image in a space using a light interference phenomenon. The projector 2266 may project light onto a screen so as to display an image. The screen may be disposed in the inside or the outside of the electronic device 2201. According to an embodiment of the present disclosure, the display 2260 may further include a control circuit for controlling the panel 2262, the hologram device 2264, or the projector 2266.

The interface 2270 may include, for example, an HDMI 2272, a USB 2274, an optical interface 2276, or a D-sub-miniature (D-sub) 2278. The interface 2270, for example, may be included in the communication interface 2170 illustrated in FIG. 21. Additionally or alternatively, the interface 2270 may include, for example, a mobile high-definition link (MHL) interface, an SD card/MMC interface, or an infrared data association (IrDA) interface.

The audio module 2280 may convert, for example, a sound into an electrical signal or vice versa. At least a portion of elements of the audio module 2280 may be included in the input/output interface 2150 illustrated in FIG. 21. The audio module 2280 may process sound information input or output through a speaker 2282, a receiver 2284, an earphone 2286, or the microphone 2288.

The camera module 2291 is, for example, a device for shooting a still image or a video. According to an embodiment of the present disclosure, the camera module 2291 may include at least one image sensor (e.g., a front sensor or a rear sensor), a lens, an ISP, or a flash (e.g., an LED or a xenon lamp).

The power management module 2295 may manage power of the electronic device 2201. According to an embodiment of the present disclosure, the power management module 2295 may include a power management IC (PMIC), a charger IC, or a battery or gauge. The PMIC may employ a wired and/or wireless charging method. The wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 2296 and a voltage, current or temperature thereof while the battery is charged. The battery 2296 may include, for example, a rechargeable battery and/or a solar battery.

The indicator 2297 may display a specific state of the electronic device 2201 or a part thereof (e.g., the processor 2210), such as a booting state, a message state, a charging state, or the like. The motor 2298 may convert an electrical signal into a mechanical vibration, and may generate a vibration or haptic effect. Although not illustrated, a processing device (e.g., a GPU) for supporting a mobile TV may be included in the electronic device 2201. The processing device for supporting a mobile TV may process media data according to the standards of digital multimedia broadcasting (DMB), digital video broadcasting (DVB), Media-FLO™, or the like.

Each of the elements described herein may be configured with one or more components, and the names of the elements may be changed according to the type of an electronic device. In various embodiments of the present disclosure, an electronic device may include at least one of the elements described herein, and some elements may be omitted or other additional elements may be added. Furthermore, some of the elements of the electronic device may be combined with each other so as to form one entity, so that the functions of the elements may be performed in the same manner as before the combination.

Figure 23:
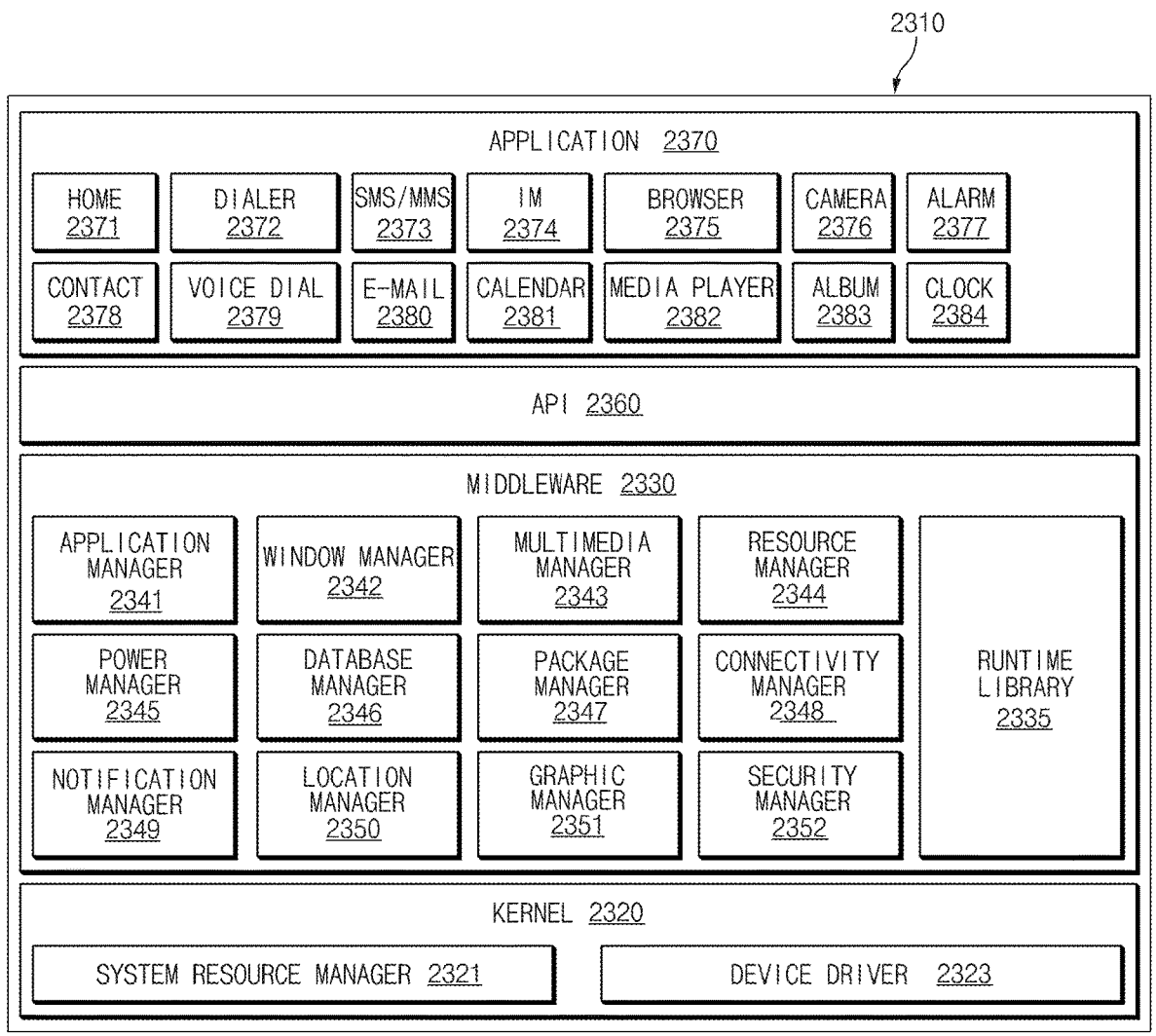
FIG. 23 is a block diagram illustrating a program module according to an embodiment of the present disclosure.

FIG. 23 is a block diagram illustrating a program module according to an embodiment of the present disclosure.

Referring to FIG. 23, a program module 2310 (e.g., the program 2140) may include an OS for controlling a resource related to an electronic device (e.g., the electronic device 2101) and/or various applications (e.g., the application 2147) running on the OS. The OS may be, for example, Android, iOS, Windows, Symbian, Tizen, or the like.

The program module 2310 may include a kernel 2320, a middleware 2330, an API 2360, and/or one or more applications 2370. At least a part of the program module 2310 may be preloaded on an electronic device or may be downloaded from an external electronic device (e.g., the first electronic device 2102, the second electronic device 2104, or the server 2106).

The kernel 2320 (e.g., the kernel 2141) may include, for example, a system resource manager 2321 or a device driver 2323. The system resource manager 2321 may perform control, allocation, or retrieval of a system resource. According to an embodiment of the present disclosure, the system resource manager 2321 may include a process management unit, a memory management unit, a file system management unit, or the like. The device driver 2323 may include, for example, a display driver, a camera driver, a BT driver, a shared memory driver, a USB driver, a keypad driver, a Wi-Fi driver, an audio driver, or an inter-process communication (IPC) driver.

The middleware 2330, for example, may provide a function that the applications 2370 require in common, or may provide various functions to the applications 2370 through the API 2360 so that the applications 2370 may efficiently use limited system resources in the electronic device. According to an embodiment of the present disclosure, the middleware 2330 (e.g., the middleware 2143) may include at least one of a runtime library 2335, an application manager 2341, a window manager 2342, a multimedia manager 2343, a resource manager 2344, a power manager 2345, a database manager 2346, a package manager 2347, a connectivity manager 2348, a notification manager 2349, a location manager 2350, a graphic manager 2351, and a security manager 2352.

The runtime library 2335 may include, for example, a library module that a complier uses to add a new function through a programming language while the application 2370 is running. The runtime library 2335 may perform a function for input/output management, memory management, or an arithmetic function.

The application manager 2341 may mange, for example, a life cycle of at least one of the applications 2370. The window manager 2342 may manage a graphical user interface (GUI) resource used in a screen. The multimedia manager 2343 may recognize a format required for playing various media files and may encode or decode a media file using a codec matched to the format. The resource manager 2344 may manage a resource such as a source code, a memory, or a storage space of at least one of the applications 2370.

The power manager 2345, for example, may operate together with a basic input/output system (BIOS) to manage a battery or power and may provide power information required for operating the electronic device. The database manager 2346 may generate, search, or modify a database to be used in at least one of the applications 2370. The package manager 2347 may manage installation or update of an application distributed in a package file format.

The connectivity manager 2348 may manage wireless connection of Wi-Fi, BT, or the like. The notification manager 2349 may display or notify an event such as message arrival, appointments, and proximity alerts in such a manner as not to disturb a user. The location manager 2350 may manage location information of the electronic device. The graphic manager 2351 may manage a graphic effect to be provided to a user or a user interface related thereto. The security manager 2352 may provide various security functions required for system security or user authentication. According to an embodiment of the present disclosure, in the case in which an electronic device (e.g., the electronic device 2101) includes a phone function, the middleware 2330 may further include a telephony manager for managing a voice or video call function of the electronic device.

The middleware 2330 may include a middleware module for forming a combination of various functions of the above-mentioned elements. The middleware 2330 may provide a module specialized for each type of an OS to provide differentiated functions. Furthermore, the middleware 2330 may delete a part of existing elements or may add new elements dynamically.

The API 2360 (e.g., the API 2145) which is, for example, a set of API programming functions may be provided in different configurations according to an OS. For example, in the case of Android or iOS, one API set may be provided for each platform, and, in the case of Tizen, at least two API sets may be provided for each platform.

The application 2370 (e.g., the application 2147), for example, may include at least one application capable of performing functions such as a home 2371, a dialer 2372, a short message service (SMS)/multimedia messaging service (MMS) 2373, an instant message (IM) 2374, a browser 2375, a camera 2376, an alarm 2377, a contact 2378, a voice dial 2379, an e-mail 2380, a calendar 2381, a media player 2382, an album 2383, a clock 2384, health care (e.g., measure an exercise amount or blood sugar), or environmental information provision (e.g., provide air pressure, humidity, or temperature information).

According to an embodiment of the present disclosure, the application 2370 may include an information exchange application for supporting information exchange between the electronic device (e.g., the electronic device 2101) and an external electronic device (e.g., the first electronic device 2102 or the second electronic device 2104). The information exchange application may include, for example, a notification relay application for relaying specific information to the external electronic device or a device management application for managing the external electronic device.

For example, the notification relay application may have a function for relaying, to an external electronic device (e.g., the first electronic device 2102 or the second electronic device 2104), notification information generated in another application (e.g., an SMS/MMS application, an e-mail application, a health care application, an environmental information application, or the like) of the electronic device. Furthermore, the notification relay application may receive notification information from the external electronic device and may provide the received notification information to the user.

The device management application, for example, may manage (e.g., install, delete, or update) at least one function (e.g., turn-on/turn off of the external electronic device itself (or some elements) or the brightness (or resolution) adjustment of a display) of the external electronic device (e.g., the first electronic device 2102 or the second electronic device 2104) communicating with the electronic device, an application running in the external electronic device, or a service (e.g., a call service, a message service, or the like) provided from the external electronic device.

According to an embodiment of the present disclosure, the application 2370 may include a specified application (e.g., a healthcare application of a mobile medical device) according to an attribute of the external electronic device (e.g., the first electronic device 2102 or the second electronic device 2104). The application 2370 may include an application received from an external electronic device (e.g., the first electronic device 2102 or the second electronic device 2104). The application 2370 may include a preloaded application or a third-party application downloadable from a server. The names of the elements of the program module 2310 illustrated may vary with the type of an OS.

According to various embodiments of the present disclosure, at least a part of the program module 2310 may be implemented with software, firmware, hardware, or a combination thereof. At least a part of the program module 2310, for example, may be implemented (e.g., executed) by a processor (e.g., the processor 2210). At least a part of the program module 2310 may include, for example, a module, a program, a routine, sets of instructions, or a process for performing at least one function.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the processor 2120), the processor may perform functions corresponding to the instructions. The computer-readable storage medium may be, for example, the memory 2130.

A computer-readable recording medium may include a hard disk, a floppy disk, a magnetic medium (e.g., a magnetic tape), an optical medium (e.g., compact (CD)-ROM, DVD), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

While the present disclosure has been shown and described with reference to certain embodiments thereof, it will be understood by those skilled in the art that various changes in form and details may be made therein without departing from the spirit and scope of the present disclosure as defined by the appended claims and their equivalents.

What is claimed is:

1. An electronic device comprising:
    an input interface configured to receive a user input, wherein the user input includes a multi touch input;
    a memory configured to store at least one application;
    a display; and
    a processor configured to:
        output a plurality of items in an execution screen of the at least one application,
        obtain the multi touch input while the execution screen of the at least one application is output,
        determine that the multi touch input is a pinch gesture input comprising a first point and a second point, and
        in response to determining that the multi touch input comprises the first point and the second point:
            calculate a center point between the first point and the second point,
            determine a classification corresponding to a distance between the first point and the second point, the classification providing a criterion for grouping the plurality of items,
            output a circular preview having a same diameter as the distance between the first point and the second point about the center point, wherein the circular preview is output on an upper layer of the execution screen,
            output a first preview of an application within the circular preview comprising at least a portion of the plurality of items grouped together according to the criterion of the classification,
            detect a change in the distance between the first point and the second point,
            determine a different classification corresponding to the changed distance, the different classification corresponding to a different criterion for grouping the plurality of items,
            change the diameter of the circular preview to match the changed distance without moving a location of the center point, the center point coinciding with the center of the changed diameter,
            output a second preview of the application within the circular preview comprising at least a portion of the plurality of items grouped together according to the criterion of the different classification,
            detect that the multi touch input is released, and
            in response to detecting the release, terminate the output of the circular preview,
        obtain another user input after the multi touch input is released, and in response to obtaining the other user input, determine an amount of time between the release of the multi touch input and the obtaining of the other user input is less than a predetermined amount of time, and in response to determining the amount of time being less than the predetermined amount of time, output a third circular preview comprising at least a portion of the plurality of items grouped together according to a criterion of a top-level classification.

2. The electronic device of claim 1, wherein the application uses an item, wherein the first preview and the second preview have a different class, and wherein the processor is further configured to select a class associated with the item or select a layout of the execution screen based on a type of the user input.

3. The electronic device of claim 2, wherein the processor is further configured to:

determine the class based on a variation of the user input, and configure the second preview such that the item is classified according to the determined class.

4. The electronic device of claim 3, wherein the processor is further configured to determine at least one of a type of the class and an order of the class based on at least one of a type of the item and user configuration information.

5. The electronic device of claim 2, wherein the processor is further configured to:

determine the layout based on a variation of the user input, and configure the second preview such that the execution screen is divided according to the determined layout.

6. The electronic device of claim 2, wherein the processor is further configured to:

determine the class as a first class or determine the layout as a first layout when a magnitude of a variation of the user input is a first size, and determine the class as a second class which is lower than the first class according to a level of the class or determine the layout as a second layout which has a fewer number of divisions than the first layout when the magnitude of the variation of the user input is a second size which is larger than the first size.

7. The electronic device of claim 1, wherein, if the user input is released, the processor is further configured to:

terminate an output of the second preview, and output the execution screen to the display.

8. The electronic device of claim 7, wherein, if another user input is obtained after the user input is released, the processor is further configured to:

determine another screen based on a variation of the other user input, wherein the other screen is configured to be outputted when the other user input is released, and while the other user input is maintained, output another preview which includes at least part of the other screen to the display, and wherein the other preview is configured based on an elapsed time from a point in time when the user input is released.

9. The electronic device of claim 8, wherein the other preview is configured with respect to a top-level class or a bottom-level class of an item or a highest priority layout or a lowest priority layout of a screen of the display when the elapsed time is greater than a designated time, and wherein the other preview is configured with respect to a current class of the item or a current layout of the screen when the elapsed time is not greater than the designated time.

10. A method of outputting a screen in an electronic device, the method comprising:

outputting a plurality of items in an execution screen of an application;

obtaining a multi touch input while the execution screen of the application is output, determining that the multi touch input is a pinch gesture input comprising a first point and a second point, in response to determining that the multi touch input comprises the first point and the second point:

calculating a center point between the first point and the second point, determining a classification corresponding to a distance between the first point and the second point, the classification providing a criterion for grouping the plurality of items, outputting a circular preview having a same diameter as the distance between the first point and the second point about the center point, wherein the circular preview is output on an upper layer of the execution screen, outputting a first preview of the application within the circular preview comprising at least a portion of the plurality of items grouped together according to the criterion of the classification, detecting a change in the distance between the first point and the second point, determining a different classification corresponding to the changed distance, the different classification corresponding to a different criterion for grouping the plurality of items, changing the diameter of the circular preview to match the changed distance without moving a location of the center point, the center point coinciding with the center of the changed diameter, outputting a second preview of the application within the circular preview comprising at least a portion of the plurality of the plurality of items grouped together according to a criterion of a different classification, detecting that the multi touch input is released, and in response to detecting the release, terminate the output of the circular preview, obtaining another user input after the multi touch input is released, and in response to obtaining the other user input, determine an amount of time between the release of the multi touch input and the obtaining of the other user input is less than a predetermined amount of time, and in response to determining the amount of time being less than the predetermined amount of time, output a third circular preview comprising at least a portion of the plurality of items grouped together according to a criterion of a top-level classification.

11. The method of claim 10, further comprising:

selecting a class associated with an item used in the application or selecting a layout of the first preview or a layout of the second preview based on a type of the multi touch input, wherein the first preview and the second preview have a different class.

12. The method of claim 11, further comprising:
determining the class based on a variation of the multi touch input; and
configuring the second preview such that the item is classified according to the determined class.

13. The method of claim 12, further comprising:
determining at least one of a type of the class and an order of the class based on at least one of a type of the item and user configuration information.

14. The method of claim 11, further comprising:
determining the layout based on a variation of the multi touch input; and
configuring the second preview such that the execution screen is divided according to the determined layout.

15. The method of claim 11, further comprising:
determining the class as a first class or determining the layout as a first layout when a magnitude of a variation of the multi touch input is a first size; and
determining the class as a second class which is lower than the first class according to a level of the class or determining the layout as a second layout which has a fewer number of divisions than the first layout when the magnitude of the variation of the multi touch input is a second size which is larger than the first size.

16. The method of claim 10, further comprising:
if the multi touch input is released, terminating an output of the second preview; and
outputting the execution screen to a display.

17. The method of claim 16, further comprising:
if another user input is obtained after the multi touch input is released, determining another screen based on a variation of the other user input, wherein the other screen is configured to be outputted when the other user input is released;
configuring another preview which includes at least part of the other screen based on an elapsed time from a point in time when the multi touch input is released; and
outputting the other preview of the other screen to the display while the other user input is maintained.

18. The method of claim 17, wherein the configuring of the other preview comprises:
configuring the other preview with respect to a top-level class or a bottom-level class of an item or a highest priority layout or a lowest priority layout of a screen of the display when the elapsed time is greater than a designated time; and
configuring the other preview with respect to a current class of the item or a current layout of the screen when the elapsed time is not greater than the designated time.

\* \* \* \* \*